(12) United States Patent
Moon et al.

(10) Patent No.: US 8,462,996 B2
(45) Date of Patent: Jun. 11, 2013

(54) METHOD AND SYSTEM FOR MEASURING HUMAN RESPONSE TO VISUAL STIMULUS BASED ON CHANGES IN FACIAL EXPRESSION

(75) Inventors: Hankyu Moon, State College, PA (US); Rajeev Sharma, State College, PA (US); Namsoon Jung, State College, PA (US)

(73) Assignee: VideoMining Corporation, State College, PA (US)

( * ) Notice: Subject to any disclaimer, the term of this patent is extended or adjusted under 35 U.S.C. 154(b) by 1169 days.

(21) Appl. No.: 12/154,002

(22) Filed: May 19, 2008

(65) Prior Publication Data

US 2009/0285456 A1 Nov. 19, 2009

(51) Int. Cl.
*G06K 9/00* (2006.01)
(52) U.S. Cl.
USPC ............................ 382/118; 351/203; 351/204
(58) Field of Classification Search
USPC .................................. 382/118; 351/203, 204
See application file for complete search history.

(56) References Cited

U.S. PATENT DOCUMENTS

| | | | |
|---|---|---|---|
| 5,774,591 A | 6/1998 | Black et al. | |
| 5,781,650 A | 7/1998 | Lobo et al. | |
| 5,852,669 A | 12/1998 | Eleftheriadis et al. | |
| 6,072,496 A | 6/2000 | Guenter et al. | |
| 6,219,639 B1 | 4/2001 | Bakis et al. | |
| 6,879,709 B2 | 4/2005 | Tian et al. | |
| 7,113,916 B1 | 9/2006 | Hill | |
| 7,120,880 B1 | 10/2006 | Dryer et al. | |
| 7,233,684 B2 | 6/2007 | Fedorovskaya et al. | |
| 2003/0098918 A1* | 5/2003 | Miller | 348/273 |
| 2004/0101212 A1* | 5/2004 | Fedorovskaya et al. | 382/305 |
| 2005/0041867 A1 | 2/2005 | Loy et al. | |
| 2005/0180626 A1* | 8/2005 | Moon et al. | 382/159 |
| 2008/0065468 A1* | 3/2008 | Berg et al. | 705/10 |

FOREIGN PATENT DOCUMENTS

GB 2419433 * 4/2006

OTHER PUBLICATIONS

U.S. Appl. No. 10/079,646, Fedorovskaya, et al.
U.S. Appl. No. 10/194,499, Hazlett, et al.
U.S. Appl. No. 11/491,411, Thaler.
U.S. Appl. No. 11/685,552, de Lemos.
U.S. Appl. No. 12/079,276, Moon, et al.
M. S. Bartlett, et al., "Measuring facial expressions by computer image analysis," Psychophysiology, Mar. 1999;36(2):253-63.

(Continued)

*Primary Examiner* — David Zarka
*Assistant Examiner* — Eueng-Nan Yeh

(57) ABSTRACT

The present invention is a method and system for measuring human emotional response to visual stimulus, based on the person's facial expressions. Given a detected and tracked human face, it is accurately localized so that the facial features are correctly identified and localized. Face and facial features are localized using the geometrically specialized learning machines. Then the emotion-sensitive features, such as the shapes of the facial features or facial wrinkles, are extracted. The facial muscle actions are estimated using a learning machine trained on the emotion-sensitive features. The instantaneous facial muscle actions are projected to a point in affect space, using the relation between the facial muscle actions and the affective state (arousal, valence, and stance). The series of estimated emotional changes renders a trajectory in affect space, which is further analyzed in relation to the temporal changes in visual stimulus, to determine the response.

26 Claims, 18 Drawing Sheets

OTHER PUBLICATIONS

Y-L. Tian, et al., "Recognizing action units for facial expression analysis," IEEE Transaction on Pattern Analysis and Machine Intelligence, Feb. 2001;23(2):97-115.

Y. Zhang, et al., "Active and dynamic information fusion for facial expression understanding from image sequences," IEEE Transactions on Pattern Analysis and Machine Intelligence, May 2005;27(5):699-714.

M. Yeasin, et al., "Recognition of facial expressions and measurement of levels of interest from video," IEEE Transactions on Multimedia, Jun. 2006;8(3):500-508.

* cited by examiner

| EMOTIONAL CATEGORY 902 | PRIMARY VISUAL CUES 957 | | | | | AUXILIARY VISUAL CUES | | | | | TRANSIENT FEATURE(S) 958 |
|---|---|---|---|---|---|---|---|---|---|---|---|
| | AU | AU | AU | AU | AU | AU | AU | AU | AU | AU | |
| HAPPINESS 901 | 6 | 12 | | | | 25 | 26 | 16 | | | WRINKLES ON OUTER EYE CANTHI. PRESENCE OF NASOLIABIAL FURROW |
| SADNESS | 1 | 15 | 17 | | | | | | | | |
| DISGUST | 8 | 10 | | | | 4 | 7 | 25 | 26 | | PRESENCE OF NASOLIABIAL FURROW |
| SURPRISE | 5 | 26 | 27 | 1+2 | | 17 | 25 | 26 | | | |
| AGNER | 2 | 4 | 7 | 23 | 24 | 17 | 25 | 26 | 16 | | FURROWS ON THE FOREHEAD VERTICAL FURROWS BETWEEN BROWS |
| FEAR | 20 | 1+5 | 5+7 | | | 4 | 5 | 7 | 25 | 26 | |

Fig.10

METHOD AND SYSTEM FOR MEASURING HUMAN RESPONSE TO VISUAL STIMULUS BASED ON CHANGES IN FACIAL EXPRESSION

BACKGROUND OF THE INVENTION

1. Field of the Invention

The present invention is a method and system to provide an automatic measurement of people's responses to visual stimulus, based on their facial expressions.

2. Background of the Invention

The human brain constantly processes sensory input to extract useful information and analyze it to understand and properly react. The expressed response is also a very important channel for revealing the internal state or for communication with other individuals, regardless of whether or not the response is voluntary. Understanding the internal psychological state of a human based on the external manifestation has been a subject of study both for scientific and practical importance.

Especially, the current consumer and market-oriented economy put a great deal of importance on people's opinions or responses to various visual stimuli—products, advertisements, or media. Most of the consumers' exposures to such visual stimuli occur in public places or retail spaces at an immeasurably high number and frequency. The ability to capture such occurrences and take measurements of the responses would provide very valuable information to retailers, marketers, or media content providers. Though it is nearly impossible to accurately determine a person's emotional response without directly asking about it, a person usually reveals some indications about it through information channels such as facial expressions or bodily gestures. It is usually the expression on the face that has high correlation with the emotional response.

Recent developments in computer vision and artificial intelligence technology make it possible to detect and track people's behavior from video sequences for further behavioral analysis. Facial image analysis has especially matured, so that faces can be detected and tracked from video images, and the motion of the facial features can also be estimated. The facial appearance changes due to facial expression can be measured to estimate the internal emotional state of a person. A host of academic studies have attempted to recognize the apparent facial expressions or emotional states of humans based on image analysis. These approaches assume more or less ideal imaging conditions and circumstances. The images are typically taken under staged circumstances so that people are instructed to show facial expressions. The facial image analysis and further recognition of expression or emotion can be carried out based on these assumptions. The proposed invention aims to solve the problem under realistic scenarios, where people show natural behavior toward visual stimuli, such as product display, advertisement media, news, movies, etc. It does not strive to measure the response—the changes in attitude or opinion in relation to the content of the visual stimulus. Furthermore, while each instance of such measurement can be erroneous, an accumulated measurement over time will provide reliable information to assess the overall attractiveness of the visual source.

While it is not entirely possible to estimate the mental state of a person based solely on the apparent changes in behavior, the changes in a person's facial expression due to the visual stimulus carry highly relevant information about a person's response through a series of both mental and physical processes. The mental state will trigger the central nervous system to transmit the information to facial muscles. The facial muscle movement then changes the shape of the facial skin so that permanent facial features change shape, or transient features such as facial wrinkles appear or change. These physical changes will render visual changes so that any capable agent (a person or a computing machine) can perceive them. People's faces can appear in any part of the scene with unknown sizes and poses, and their positions, sizes, or poses change over time. The images are also subject to varied lighting conditions. The proposed invention is designed based on this model of information channel from the internal state to the appearance changes; the steps are laid out to solve each reverse problem.

This invention adopts a series of both well-established and novel approaches for facial image processing and analysis to solve these tasks. Face detection and tracking handle the problem of locating faces and making correspondences between detected faces that belong to the same person. Face localization will normalize the facial geometry so that facial features are aligned to standard positions. Under realistic imaging conditions, the extraction of exact facial feature contours can be noisy and erroneous. This invention introduces a novel approach to extract facial appearance changes due to facial expressions; a collection of image gradient filters are designed that match the shapes of facial features or transient features. A filter that spans the whole size of the feature shape does a more robust job of extracting shapes than do local edge detectors, and will especially help to detect weak and fine contours of the wrinkles (transient features) that may otherwise be missed using traditional methods. The set of filters are applied to the aligned facial images, and the emotion-sensitive features are extracted. These features train a learning machine to find the mapping from the appearance changes to facial muscle actions. In an exemplary embodiment, the 32 Action Units from the well-known Facial Action Coding System (FACS, by Ekman & Friesen) are employed. The recognized facial actions can be translated into six emotion categories: Happiness, Sadness, Surprise, Anger, Disgust, and Fear. These categories are known to reflect more fundamental affective states of the mind: Arousal, Valence, and Stance. This invention assumes that these affective states, if estimated, provide information more directly relevant (than do the six emotion categories) to the recognition of people's attitude toward a visual stimulus. For example, the degree of valence directly reveals the positive or negative attitude toward the visual stimulus. The changes in emotional state will then render a trajectory in the three-dimensional affect space. Another novel feature of the invention is to find a mapping from the emotion trajectories to the final response. The central motivation behind this approach is that, while the emotion trajectory already contains very useful information regarding the response of the person to the visual stimulus, there can be still another level of mental process to make a final judgment, such as purchase, opinion, rating, etc. These are the kind of action that ultimately interest the marketers or content providers, and we refer to such process as 'response'. The emotional trajectory also needs to be interpreted in the context of the dynamics of the visual stimulus. The mapping from the emotion trajectory to the response can also be estimated by training a learning machine using many samples of video sequence along with the ground-truth response data.

There have been prior attempts for detecting and localizing facial features from facial images for the purpose of further facial image analysis.

U.S. Pat. No. 5,781,650 of Lobo, et al. (hereinafter Lobo) disclosed a method for automatically finding facial images of a human face in a digital image, and classifying the age of the person into an age category. Step 1 of the process is to find facial features of the digital image encompassing the chin, sides of the face, and the virtual top of the head, eyes, mouth and nose of the image. Step 2 is to compute the facial feature ratios of the facial features found in Step 1. Step 3 is to compute a wrinkle analysis of the image. Step 4 is to combine the previous two steps to categorize the age of the facial image. The invention can locate and detect facial images for age classification from digital camera images and computerized generated images.

U.S. Pat. No. 5,852,669 of Eleftheriadis, et al. (hereinafter Eleftheriadis) disclosed a method that responds to a video signal representing a succession of frames to detect at least a region of the object. The method processes the video signal to detect the region of the object characterized by a portion of a closed curve and to generate a plurality of parameters associated with the closed curve.

U.S. Pat. No. 6,219,639 of Bakis, et al. (hereinafter Bakis) disclosed a method for recognizing an individual based on attributes associated with the individual. Bakis combined and synchronized biometric and non-biometric features with one another in order to provide a better accuracy of the recognition.

U.S. Pat. No. 7,058,209 of Chen, et al. (hereinafter Chen) disclosed a digital image processing method that detects facial features in a digital image. Chen's method was to apply a geometric reasoning using iris pixel clusters, a summation of squared difference based on iris pixel clusters, or a summation of squared difference method from the pixels in the image.

U.S. Pat. Appl. Pub. No. 2005/0041867 of Loy, et al. (hereinafter Loy) disclosed a method of automatically detecting the location of a face using a pair of eye locations.

U.S. patent application Ser. No. 12/079,276 of Moon, et al. (hereinafter Moon) disclosed a method and system to provide a face-based automatic gender recognition system that utilizes localized facial features and hairstyles of humans. Given a human face detected from a face detector, it is accurately localized to facilitate the facial/hair feature detection and localization. Facial features are more finely localized using the geometrically distributed learning machines. Then the position, size, and appearance information of the facial features are extracted. The facial feature localization essentially decouples geometric and appearance information about facial features, so that a more explicit comparison can be made at the recognition stage. The hairstyle features that possess useful gender information are also extracted based on the hair region segmented, using the color discriminant analysis and the estimated geometry of the face. The gender-sensitive feature vector, made up from the extracted facial and hairstyle features, is fed to the gender recognition machines that have been trained using the same kind of gender-sensitive feature vectors of gallery images.

In Lobo, the facial feature detection is performed under close range high-resolution frontal face images to extract features for age classification. In Eleftheriadis, the facial feature detection is used for image compression, by employing edge and model-based scheme. In Bakis, the lip contour registration is performed for the purpose of multi-modal speaker recognition or verification. In Chen, eyes are detected and localized in a human face, based on the iris color signature and the cluster analysis of the iris color pixels. In Loy, eye candidates are detected first using geometric model of eye images. Based on the eye candidate locations, the facial region is detected, and other facial regions are detected and verified using geometric reasoning (facial features topology). In Moon, a combination of face localization and facial feature localization, based on training multiple learning machines on a large number of data, is used to extract features for recognizing gender.

In most of the mentioned prior inventions, either high-resolution facial images or good quality color facial images are required to reliably detect facial features. The success of these approaches also depends on successful face detection or initial (mostly eyes) features detection. In the proposed invention, an approach similar to Moon is used; the robust facial localization based on a large number of samples is performed after machine learning-based face detection. The facial features are accurately localized within already roughly localized facial feature windows, again using learning machines trained to localize only each given facial feature. The present method does not require high-resolution images or color information; it works with either gray-level or color images, and it works under various imaging conditions due to the training with a large number of images taken under various imaging conditions.

There have been prior attempts for automatically recognizing facial expression of a person using video images.

U.S. Pat. No. 5,774,591 of Black, et al. (hereinafter Black) disclosed a system that tracks human head and facial features over time by analyzing a sequence of images and recognizes facial expression.

U.S. Pat. No. 6,072,496 of Guenter, et al. (hereinafter Guenter) disclosed a method that captures a 3D model of a face for representing facial expressions. Guenter teaches a 3D mesh and a series of deformations of the mesh that define changes in position of the mesh over time.

U.S. Pat. No. 6,879,709 of Tian, et al. (hereinafter Tian-1) disclosed a system for automatically detecting neutral expressionless faces in digital images and video.

U.S. Pat. Appl. Pub. No. 2007/0265507 of Lemos (hereinafter Lemos) disclosed a system and method for determining visual attention and emotional response.

"Measuring facial expressions by computer image analysis," Psychophysiology, vol. 36, issue 2, by Barlett, et al. (hereinafter Barlett) disclosed a method for facial expressions recognition that applies computer image analysis to the problem of automatically detecting facial actions in sequences of images. Three approaches were compared: holistic spatial analysis, explicit measurement of features such as wrinkles, and estimation of motion flow fields. The three methods were combined in a hybrid system that classified six upper facial actions with 91% accuracy.

"Recognizing Action Units for Facial Expression Analysis," IEEE Transactions on Pattern Analysis and Machine Intelligence, vol. 23, no. 2, by Tian, et al. (hereinafter Tian-2) disclosed an automatic face analysis system to analyze facial expressions based on permanent facial features and transient facial features in a nearly frontal-view face image sequence utilizing Action Units (AUs) of the Facial Action Coding System (FACS).

"Active and dynamic information fusion for facial expression understanding from image sequences," IEEE Transactions on Pattern Analysis and Machine Intelligence, Vol 27, Issue 5, by Zhang, et al. (hereinafter Zhang) disclosed a method that uses multisensory information fusion technique with dynamic Bayesian networks (DBN) for modeling the temporal behaviors of facial expressions in image sequences.

"Recognition of facial expressions and measurement of levels of interest from video," IEEE Transactions on Multimedia, Volume 8, Issue 3, by Yeasin, et al. (hereinafter Yeasin) disclosed a spatio-temporal approach in recognizing six facial expressions from visual data.

In Black, the motions of the facial features due to expression are estimated by computing an explicit parametric model of optical flow. The facial feature motions are translated into mid-level predicates, which in turn are used to determine the expression categories. The proposed invention utilizes emotion-sensitive features that extract feature shape changes implicitly, just to be fed to a learning machine to estimate the facial muscle action. In Guenter, the facial actions are estimated in terms of very involved three-dimensional mesh model by tracking a set of dedicated marker points. The present invention strives to estimate the shape change of the facial features just enough to determine the facial muscle action, without using any artificial markers. Tian-1 only aims to detect emotionless faces, while the present invention tries to estimate the change of expressions in a space representing the whole range of human emotions. In Lemos, mostly eye tracking estimates are used to assess the degree of attention and the location of attention within the visual stimulus. The present invention shares a similar goal of estimating human response in relation to a given visual stimulus, but introduces a different focus on the measurement of whole facial feature shapes to determine the emotional changes to a visual stimulus, with specific technical methods to estimate the facial actions, emotional changes, and finally the response. Barlett aims to estimate upper facial Action Units utilizing the holistic, feature-based, and motion (flow)-based image representation and a neural network based learning of the representation. Tian-2 also estimates parametric models of facial feature shapes, and employs neural networks to learn the mapping to the facial Action Units. The present invention also estimates the facial Action Units in an exemplary embodiment of facial muscle actions, and utilizes learning machine to find a mapping from the image representation to the muscle actions. However, the present invention utilizes emotion-sensitive feature extraction scheme, which is different from Barlett or Tian-2. The present invention also utilizes a novel scheme to localize a face and its facial features, while in Barlett the faces are assumed to be aligned. In Zhang, the dynamic change of facial expressions is recognized by a series of methods starting from IR-based eye detection, and facial feature detection based on the eye detection. The facial Action Units recognition is based on deterministic correspondence. The present invention employs novel combination of the face detection, localization, and facial feature localization. The mapping from the facial features shapes to the facial muscle actions is learned by training on a large number of samples.

There have been prior attempts for automatically measuring the audience response to displayed objects or media.

U.S. Pat. No. 7,113,916 of Hill (hereinafter Hill) disclosed a method of assessing consumer reaction to a marketing stimulus.

U.S. Pat. No. 7,120,880 of Dryer, et al. (hereinafter Dryer) disclosed a system for unobtrusively detecting a subject's level of interest, e.g. attention and arousal level, in media content.

U.S. Pat. No. 7,233,684 of Fedorovskaya, et al. (hereinafter Fedorovskaya-1) disclosed a system for using affective information.

U.S. Pat. Appl. Pub. No. 2003/0156304 of Fedorovskaya, et al. (hereinafter Fedorovskaya-2) disclosed a method for collecting and associating affective information for at least one image in an imaging system.

U.S. Pat. Appl. Pub. No. 2003/0032890 of Hazlett, et al. (hereinafter Hazlett) disclosed a method for measuring emotional and cognitive responses to advertising through facial electromyographic techniques.

U.S. patent application Ser. No. 11/491,411 of Thaler (hereinafter Thaler) disclosed a neural network-based rating system that rates records in a database and determines user preference pattern.

Hill aims to measure consumer reaction to marketing stimulus, whose goal is shared by the present invention. However, Hill lists interviewing and manual video coding as tools for collecting opinions and facial expressions. Dryer proposes a system utilizing a host of measurement modalities, such as facial expression, head gesture, or speech, to assess the level of interest to media contents. Fedorovskaya-1 and Fedorovskaya-2 propose systems measuring affective information based on visual image or physiological signal of a person and associating the affective information with the image and person, respectively. Hill, Dryer, Fedorovskaya-1, and Fedorovskaya-2 all propose overall systems, without introducing a very specific novel technical means to achieve the recognition of the response or affective information. The present invention introduces novel technology to automatically extract relevant information from the raw image data and recognize the internal (mental/emotional) state of a human. Hazlett proposes an emotional response measurement based on electromyographic signal of facial muscles, while the present invention processes common visual signal to make the same kind of measurement. Thaler presents a rating system utilizing neural networks, without specific reference to how the input data to the neural network is generated. The present invention also uses learning machines such as neural networks, but the learning machines are trained to process feature vectors that are extracted from video images following novel and specific procedures.

In summary, the present invention provides fully automatic face localization and facial feature localization approaches, for accurately extracting facial and transient features to estimate facial muscle actions due to emotion changes. It is a key novel feature of the present invention to train a learning machine based on the extracted emotion-sensitive features to estimate the facial muscle action; the emotion-sensitive features are designed to extract image features that are highly correlated with the facial expressions. The present invention shares the goal of estimating human response in relation to a given visual stimulus similar to other rating approaches, but it adopts a unique method to predict the final response based on the continuous emotion trajectory, estimated over the course of the visual stimulus.

SUMMARY

The present invention is a method and system for automatically measuring the response of a human to a visual stimulus, which utilizes emotion-sensitive features to recognize facial expressions and analyzes the emotion changes in affect space.

It is one of the objectives of the first step of the processing to train the face localization machines and the facial feature localization machines. The face localization training requires facial images having varied two-dimensional geometry—(X, Y) shifts, sizes S, and orientations O—that reflect the variations from the face detection step, along with the ground-truth values of these variations. Multiple learning machines are trained, where each machine is trained to output high response to facial images having (X, Y, S, O) close to the predetermined (X0, Y0, S0, O0) of the machine. The facial feature localization training proceeds in the same way, so that multiple learning machines are prepared and trained for each facial feature.

It is one of the objectives of the second step of the processing to detect, track, and localize faces in given images, and localize facial features. A detected and tracked face in a given image frame has a bounding box around the face that approximately delimits its position and size. The image inside the bounding box is cropped, rescaled to a standard size (for example, 30×30), and fed to the face localization machines. The face localization machines estimate the geometry in cooperation, and the facial image is localized based on these estimates. The facial feature images are cropped from the localized facial image, according to the placements of the standard feature windows. The facial feature localization machines estimate the position, size, and orientation variations of the facial features inside the standard feature windows.

It is one of the objectives of the third step of the processing to extract emotion-sensitive features. First, the step derives a set of filters that are matched to facial feature shapes or transient feature (facial wrinkles) shapes, so that the filters can extract the features relevant to facial expressions, and at the same time can ignore other image variations due to lighting and interpersonal variations, etc. A large number of emotion-sensitive feature candidate filters are generated that are designed to extract edge responses around the facial features or transient features. Then the filters are applied to many facial images showing a variety of facial expressions, and the subset of the candidate filters that gave rise to sufficient response to a large proportion of facial images are chosen as the emotion-sensitive feature filters.

Then each filter in the emotion-sensitive feature filters is applied to a correspondingly aligned feature in the image to compute the response. All the responses are collected in the emotion-sensitive feature vector.

It is one of the objectives of the fourth step of the processing to recognize the facial muscle actions. It is not straightforward to make a direct connection between the emotion-sensitive filter responses and the facial expressions due to the complex relation between the image responses and the expressions; a large number of such emotion-sensitive feature vectors along with the ground-truth expression categories are utilized to learn the relation in a machine learning framework. The trained facial muscle action recognition machine accepts the emotion-sensitive feature vector as an input and computes the likelihoods of the input face showing the corresponding muscle actions.

It is one of the objectives of the fifth step of the processing to estimate the emotion trajectory in affect space that represents the changes in emotion. The computed facial muscle actions are mapped to the six emotional categories using deterministic relations between the facial muscle actions and the six emotional categories. Then, based on the affect space coordinates of the six emotional categories, the facial muscle actions are mapped into affect space. The temporal sequence of facial muscle actions due to emotion changes constructs an emotion trajectory in affect space.

It is one of the objectives of the sixth step of the processing to interpret the emotion trajectory in affect space to derive meaningful characteristics of the response to the visual stimulus. The interpretation can be carried out in the context of the visual stimulus, so that the emotional change can be analyzed in relation to the content of the visual stimulus. The mapping from the emotion trajectory to the response can be learned by training a learning machine using many samples of video sequence along with the ground-truth response data. Exemplary response data can be ratings, purchase decisions, or expressed opinions.

DRAWINGS

Figures

FIG. 10 lists a table that shows the relation between the FACS Action Units and the set of six emotional categories, in an exemplary embodiment of the present invention.

Figure 11:
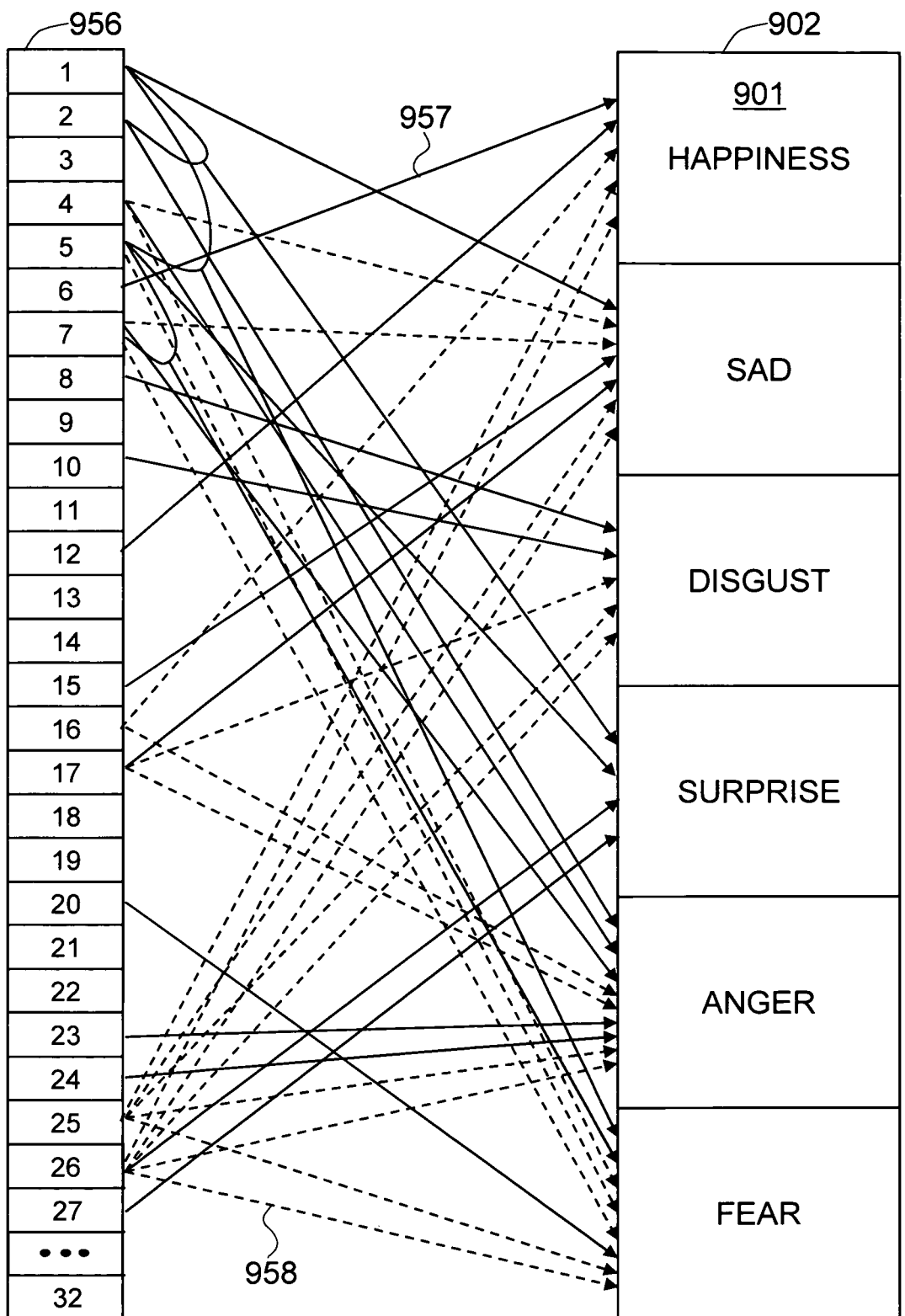

FIG. 11 shows an exemplary embodiment of the mapping from the FACS Action Units to the six emotional categories.

Figure 12:
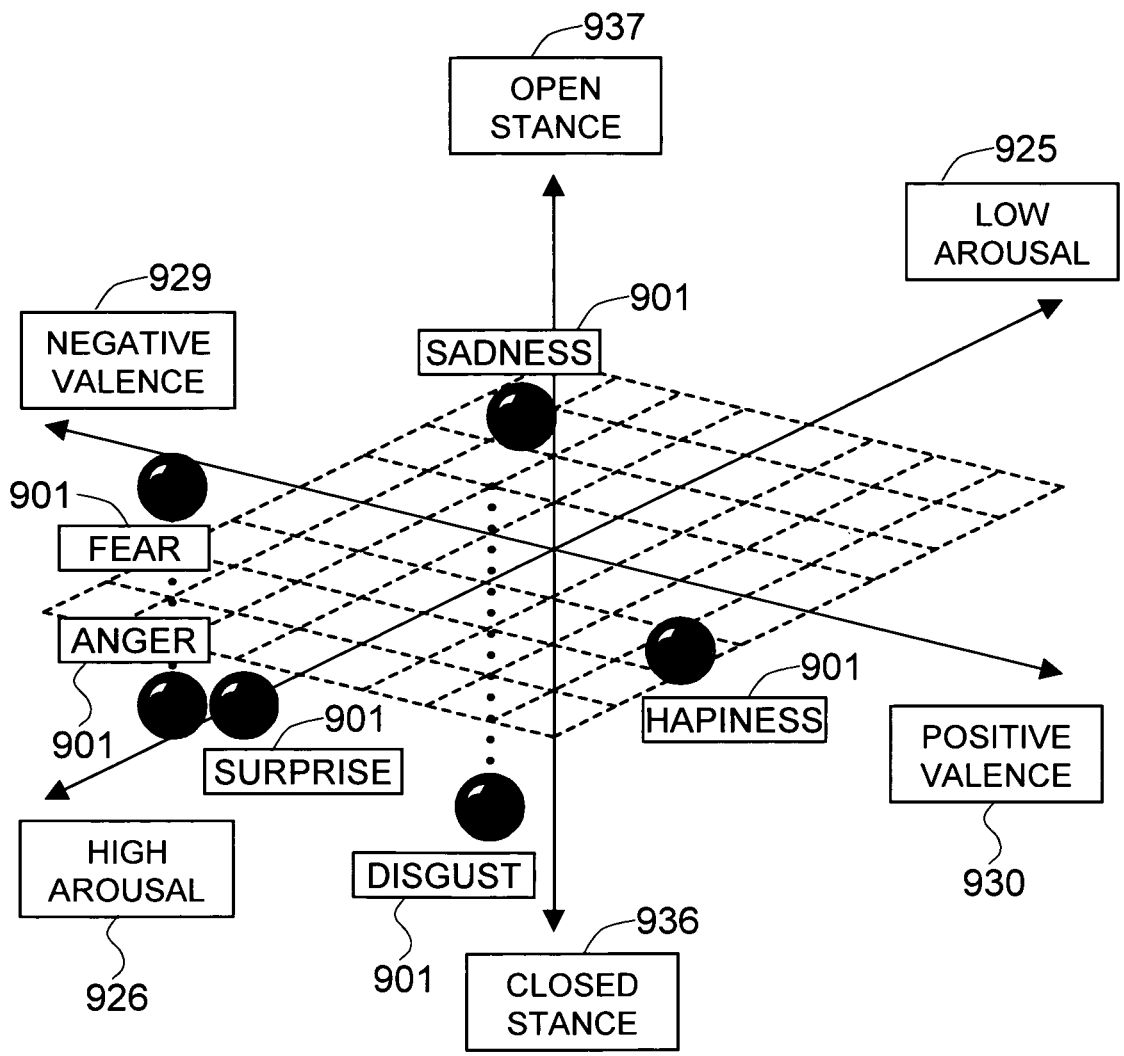

FIG. 12 shows a spatial arrangement of six emotional categories in the three-dimensional affect space.

Figure 13:
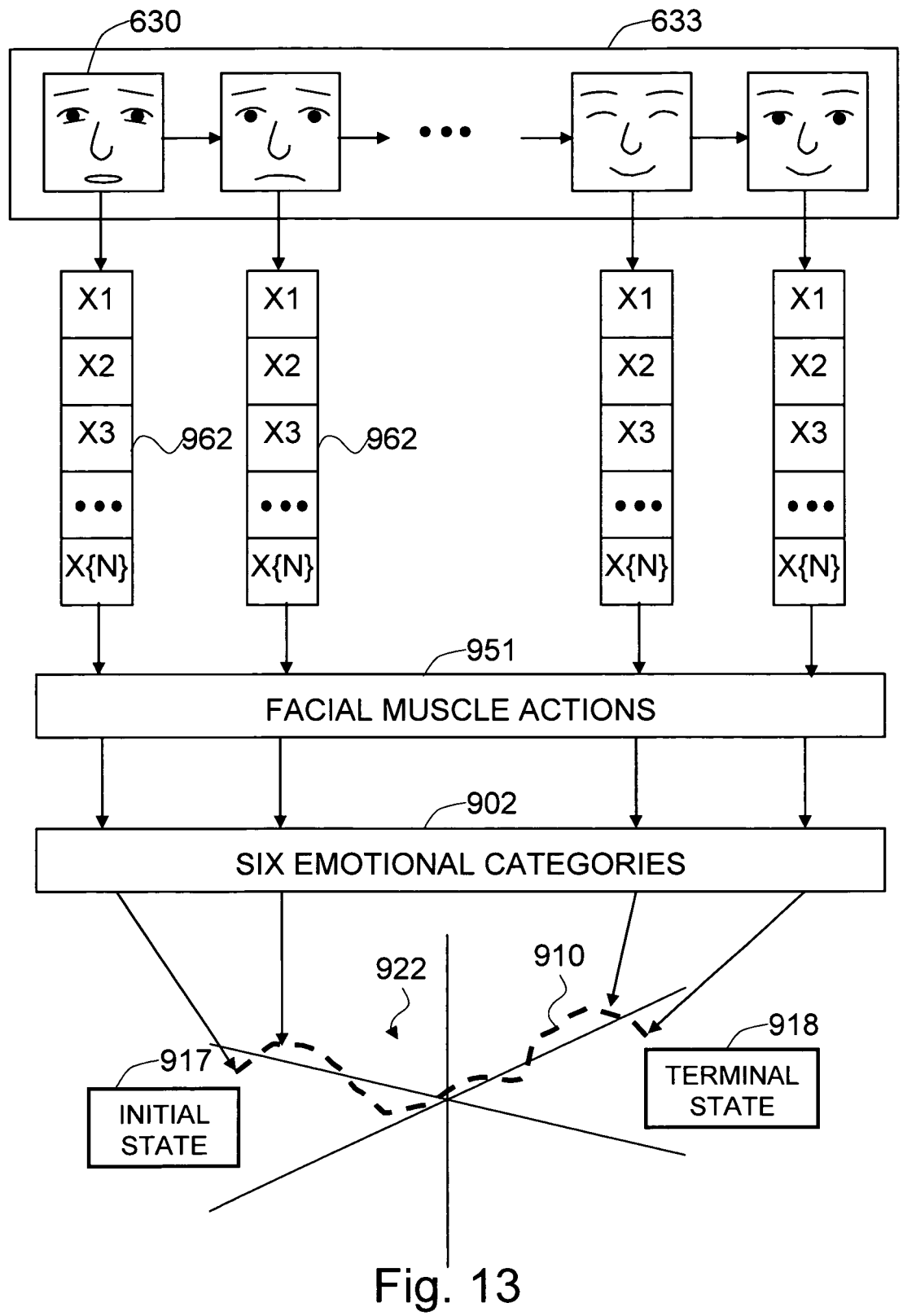

FIG. 13 shows an exemplary embodiment of how the measured instances of facial muscle actions from facial images are projected into the affect space to construct an emotion trajectory.

Figure 14:
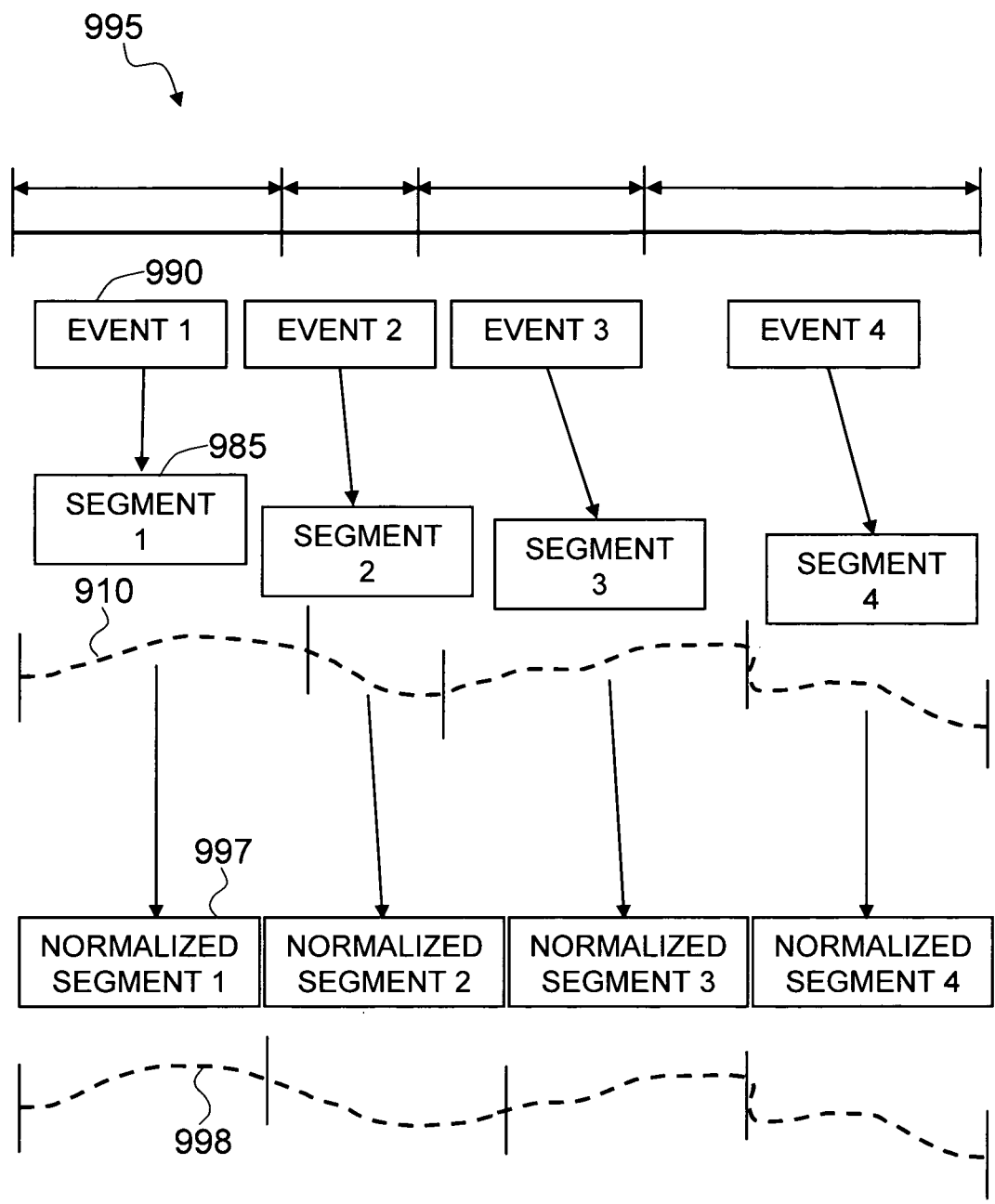

FIG. 14 shows an exemplary embodiment of the emotion trajectory normalization step.

Figure 15:
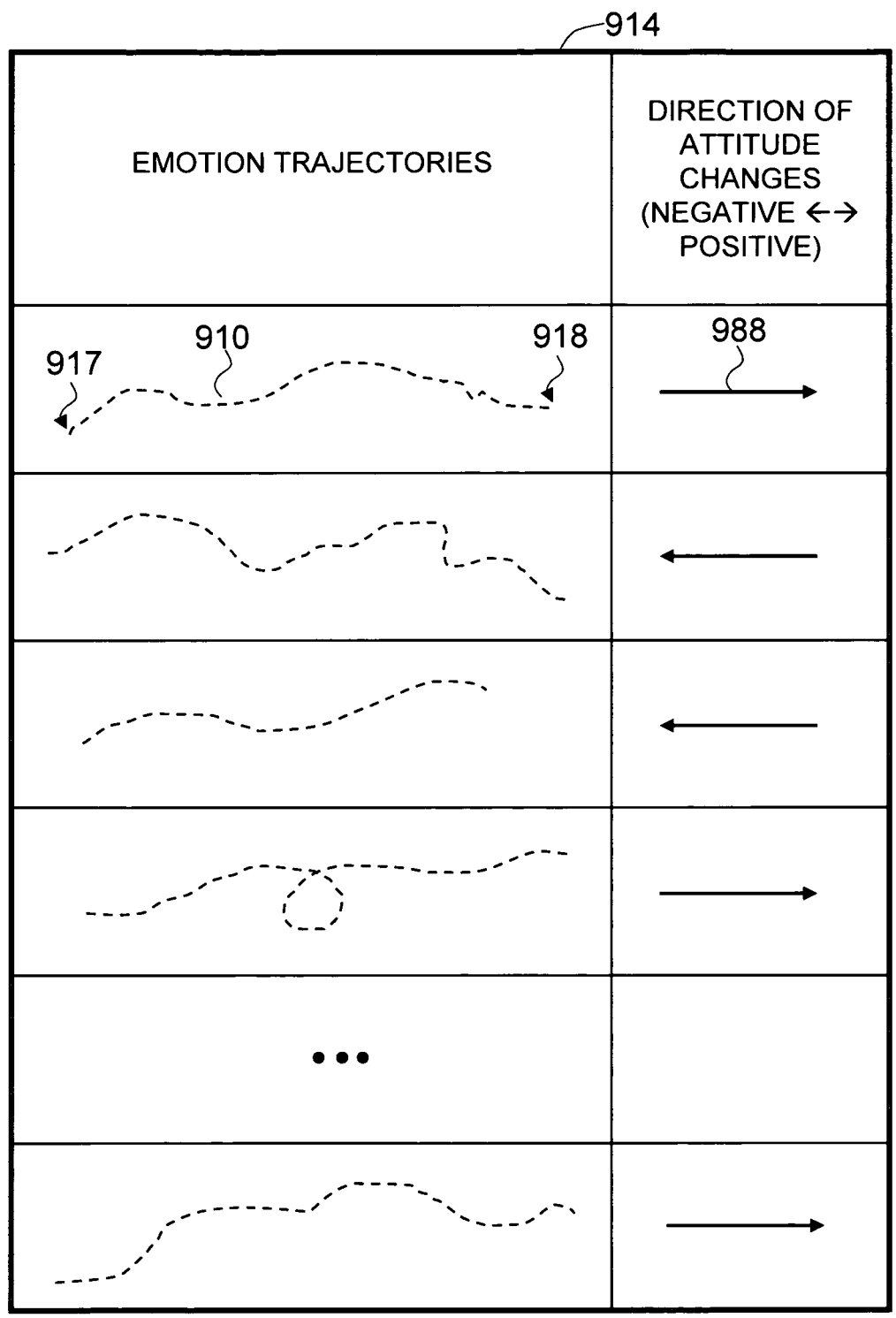

FIG. 15 shows an exemplary embodiment of the response estimation step.

Figure 16:
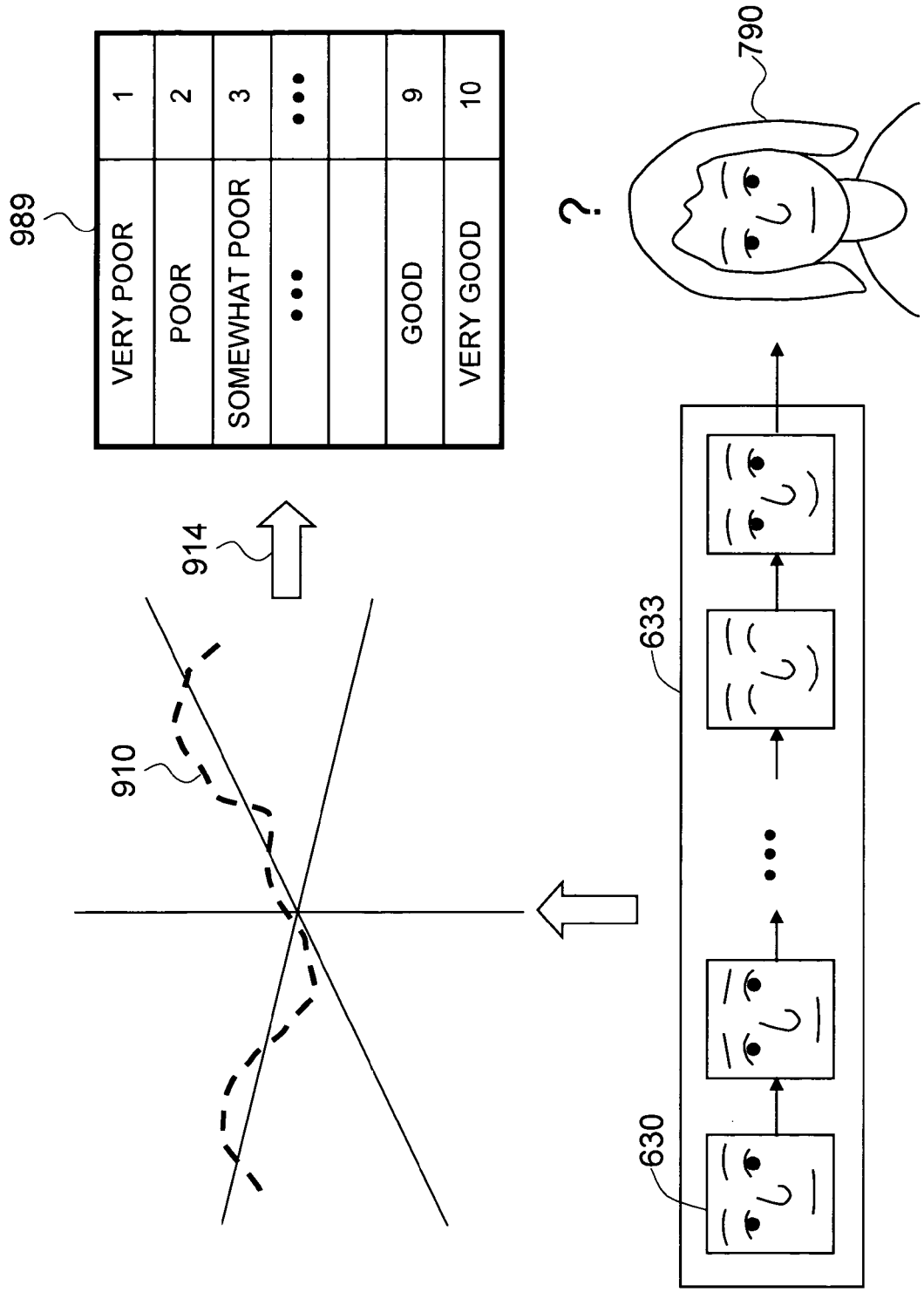

FIG. 16 shows an exemplary embodiment of the response estimation step.

Figure 17:
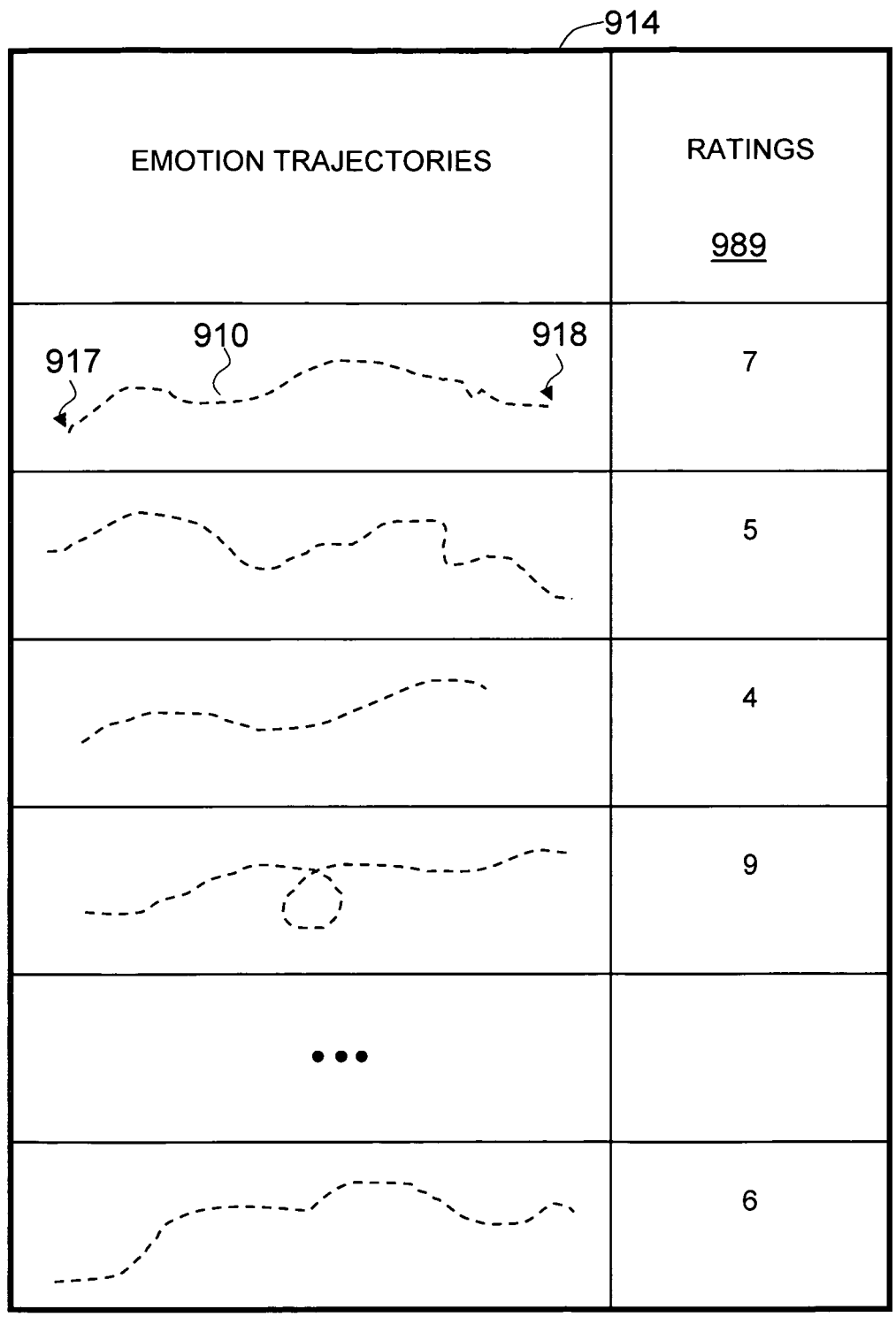

FIG. 17 shows an exemplary embodiment of the emotion trajectory to response learning step.

Figure 18:
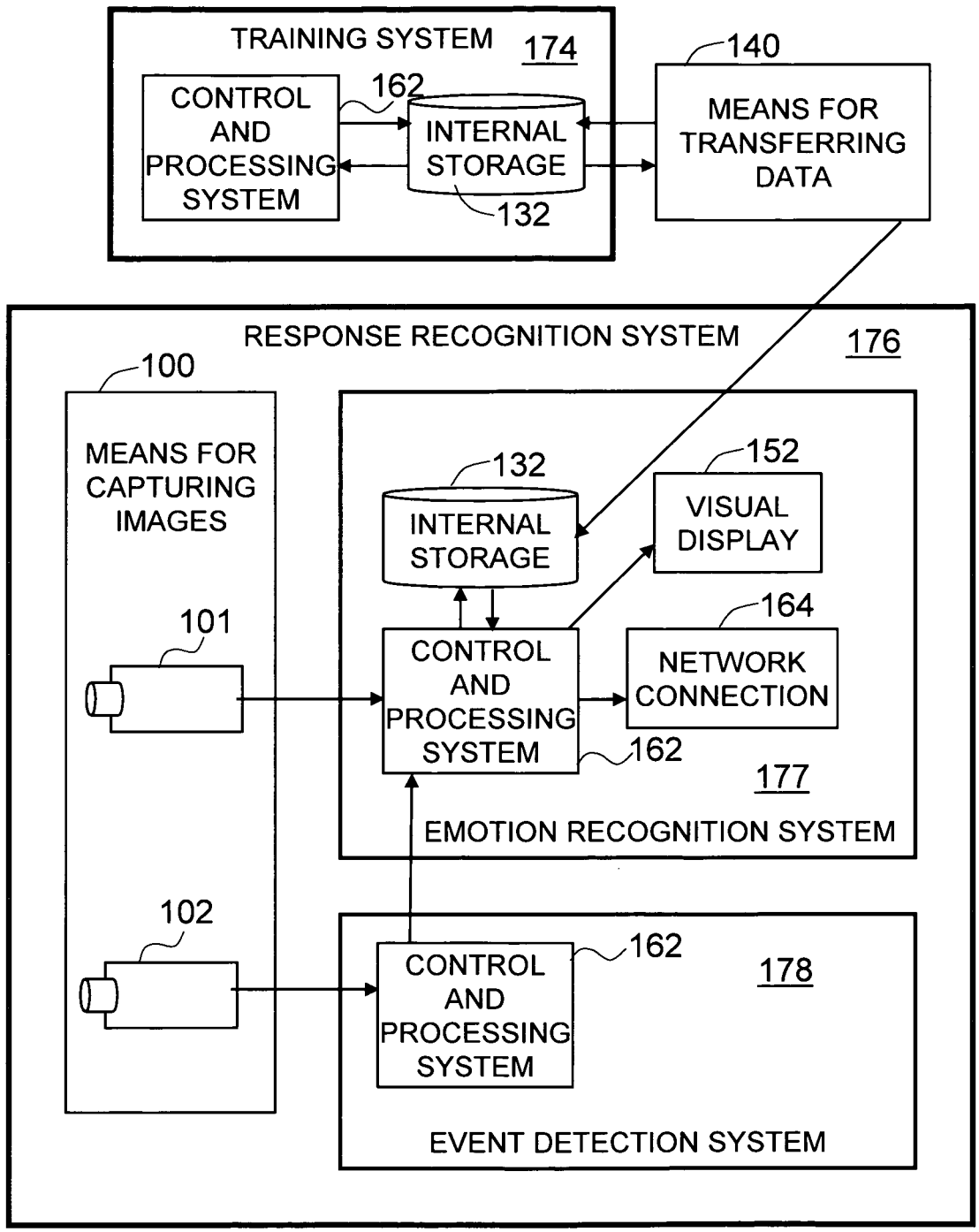

FIG. 18 shows exemplary hardware components in an exemplary embodiment of the present invention.

DETAILED DESCRIPTION OF THE INVENTION

Figure 1:
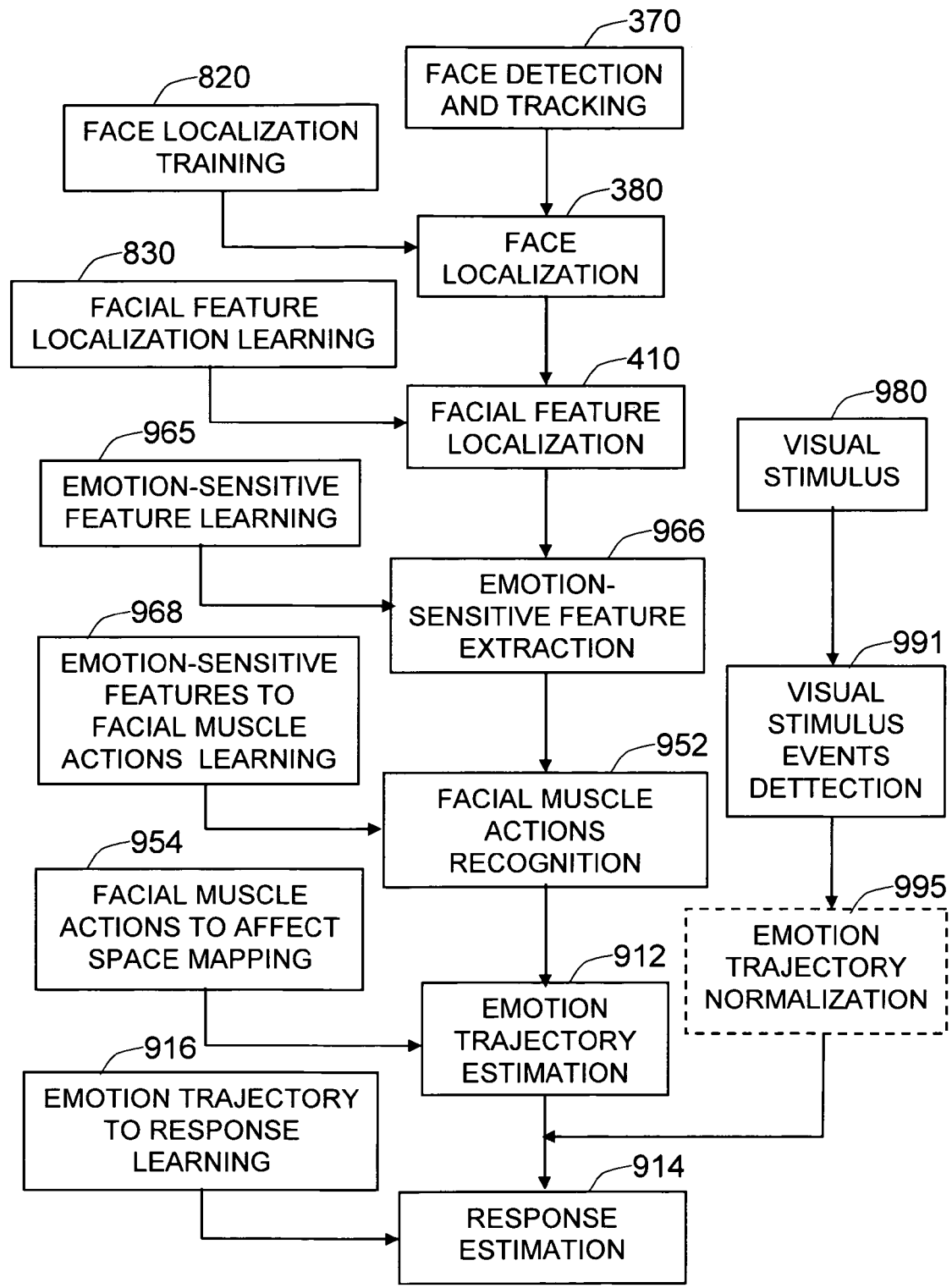
FIG. 1 is an overall scheme of the system in a preferred embodiment of the invention.

FIG. 1 is an overall scheme of the system in a preferred embodiment of the invention. Given any input image frame that potentially contains human faces, the face detection and tracking 370 step detects any human faces and keeps individual identities of them by tracking them. Using the learning machine trained from face localization training 820, the face localization 380 step then computes the (X, Y) shift, size variation, and orientation of the face inside the face detection window to normalize the facial image. Employing the learning machine trained from the facial feature localization training 830, the facial feature localization 410 step then finds the accurate positions and boundaries of the facial features, such as eyes, eyebrows, nose, and mouth, etc., based on the previously computed location, size, and orientation of the face. Using the filters learned from the emotion-sensitive feature learning 965, the emotion-sensitive feature extraction 966 step computes the emotion-sensitive features 961 from the localized facial and transient features. Using the learning machine trained from emotion-sensitive features to facial muscle actions learning 968 step, the facial muscle actions recognition 952 step identifies the facial muscle actions 951 manifested on the face. Then the deterministic facial muscle actions to affect space mapping 954 generates the emotion trajectory 910 in affect space 922 (emotion trajectory estimation 912). Depending on the requirements of the application, the emotion trajectory to response learning 916 step finds an appropriate scheme to interpret the emotion trajectory, where any relevant events information detected (by the visual stimulus event detection 991 step) from the visual stimulus 980 can also be incorporated. The visual stimulus 980 can be segmented based on the detected events, and the emotion trajectory 910 can also be segmented and temporally normalized according to the detected events in the visual stimulus 980. In an exemplary embodiment, the mapping from the emotion trajectory to the response is learned by training a learning machine using many samples of emotion trajectories along with the ground-truth response data. The response includes (lasting) mental states or actions, such as ratings, opinions, or purchase decisions.

Figure 2:
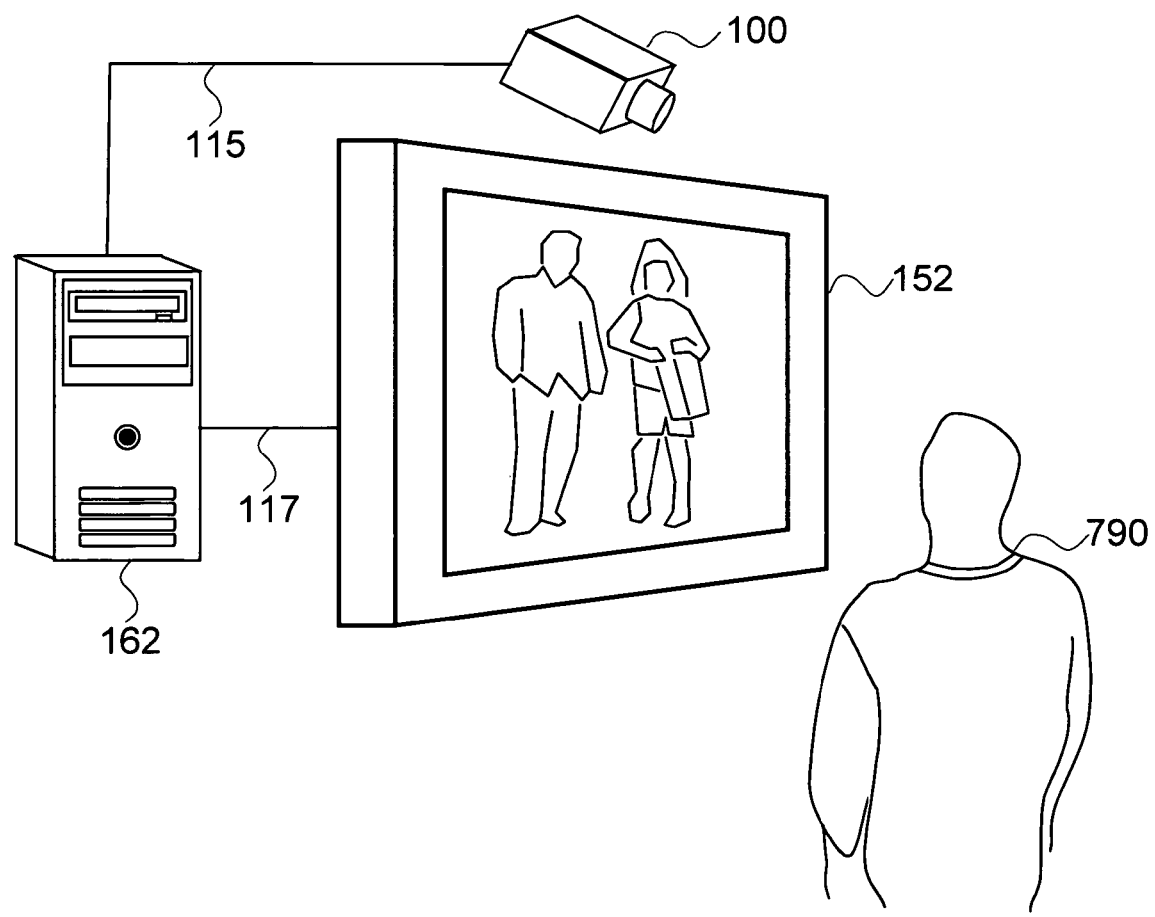
FIG. 2 shows a view of the system of the invention in an operational environment in an exemplary embodiment.

FIG. 2 shows a view of the system of the invention in an operational environment in an exemplary embodiment. The means for capturing images 100 is placed near the media display 152, so that it can capture the faces of media audience 790 watching the display. The displayed media content is the visual stimulus in this embodiment, and is controlled by the control and processing system 162. The video feed from the means for capturing images 100 is transferred to the control and processing system 162 via means for video interface 115, and the time stamps of the meaningful events of the displayed media content is also provided to the control and processing system 162 via a means for data transfer 117, so that the control and processing system 162 can process both sources of information to interpret the response of the media audience 790 in relation to the visual stimulus 980.

In another exemplary embodiment, the visual stimulus events 990 can be recognized by the control and processing system 162, using an appropriate video segmentation algorithm, such as scene change detection.

Figure 3:
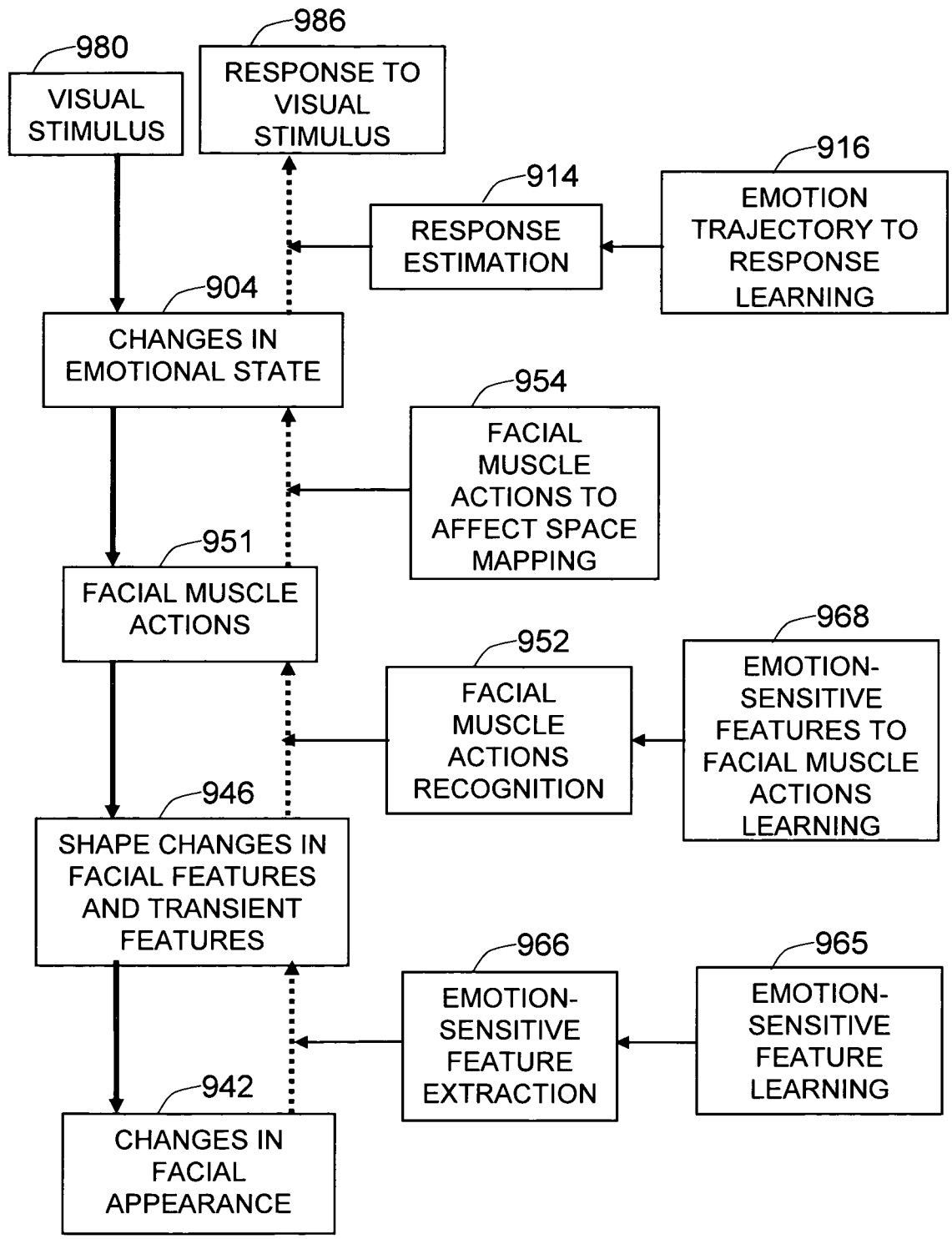
FIG. 3 shows a model of the forward chain of actions and the reverse chain of estimations between the visual stimulus and the facial expressions of the human watching the visual stimulus.

FIG. 3 shows a model of the forward chain of actions from the visual stimulus to the facial expressions of the human watching the visual stimulus. This model serves as a basis for the methods of the present invention, which are the reverse chain of estimations, to determine the end response from the facial manifestation of the emotional changes. The stepwise procedure has been laid out: the procedure of how the visual stimulus 980 affect the internal mental and physical states of the person to manifest the changes in facial appearance 942 at the end, and the necessary procedures to estimate the response 986 reversely from the changes in facial appearance 942. First, the visual stimulus 980 triggers the changes in emotional state 904 of the person. The central nervous system then transmits the signal to facial muscles so that the contraction of the muscles generates the specific facial muscle actions 951. The facial muscle actions 951 render the shape changes in facial features and transient features 946, which then manifest the changes in facial appearance 942. The proposed method aims to solve the reverse problem by employing an appropriate measure for each of these processes. First the set of emotion-sensitive filters 963, which was determined from the emotion-sensitive feature learning 965 step, estimates the shape changes in facial features and transient features 946 in the emotion-sensitive feature extraction 966 step. From the estimated shape changes in facial features and transient features 946, the facial muscle actions recognition 952 step (learned from emotion-sensitive features to facial muscle actions learning 968 step) identifies the facial muscle actions 951 that triggered the shape changes. The series of recognized facial muscle actions 951 is then mapped to the changes in emotional state 904, which is represented by an emotion trajectory 910 using deterministic facial muscle actions to affect space mapping 954. In this exemplary embodiment, the emotion trajectories 911 annotated with the response information are used to train the response estimation 914 in emotion trajectory to the response learning 916 step. The response estimation 914 can then accept any emotion trajectory to estimate the final response to visual stimulus 986.

Figure 4:
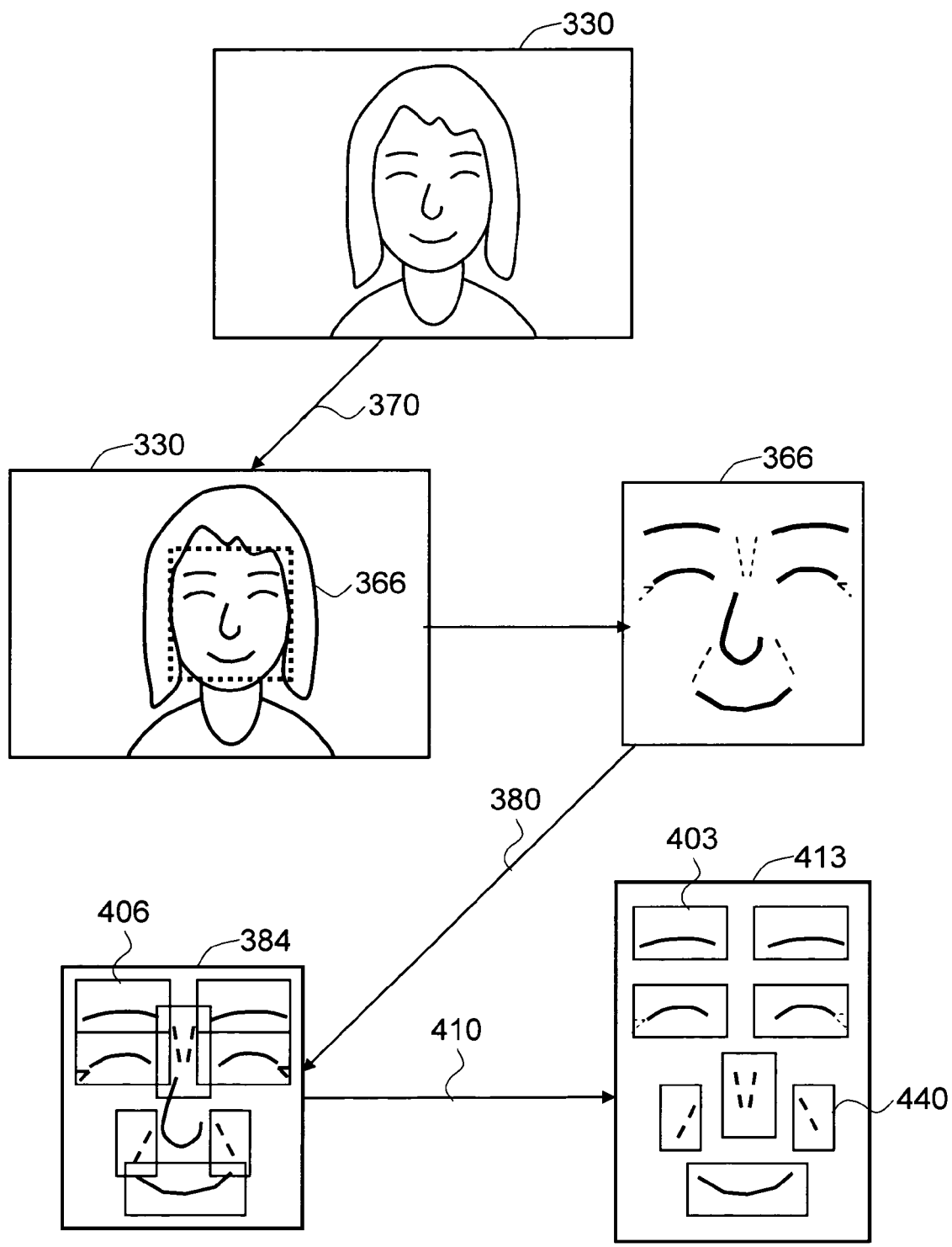
FIG. 4 shows a series of facial image processing, from face detection and tracking to face localization, and to facial feature localization.

FIG. 4 shows a series of facial image processing, from face detection and tracking 370 to face localization 380, and to facial feature localization 410. Any image-based face detection algorithm can be used to detect human faces from an input image frame 330. Typically, a machine learning-based face detection algorithm is employed. The face detection algorithm produces a face window 366 that corresponds to the locations and the sizes of the detected face. The face localization 380 step estimates the two-dimensional and three-dimensional poses of the face to normalize the face to a localized facial image 384, where each facial feature is localized within a standard facial feature window 406. The facial feature localization 410 then finds the accurate locations of each facial feature or transient feature to extract them in a facial feature window 403 or a transient feature window 440.

Figure 5:
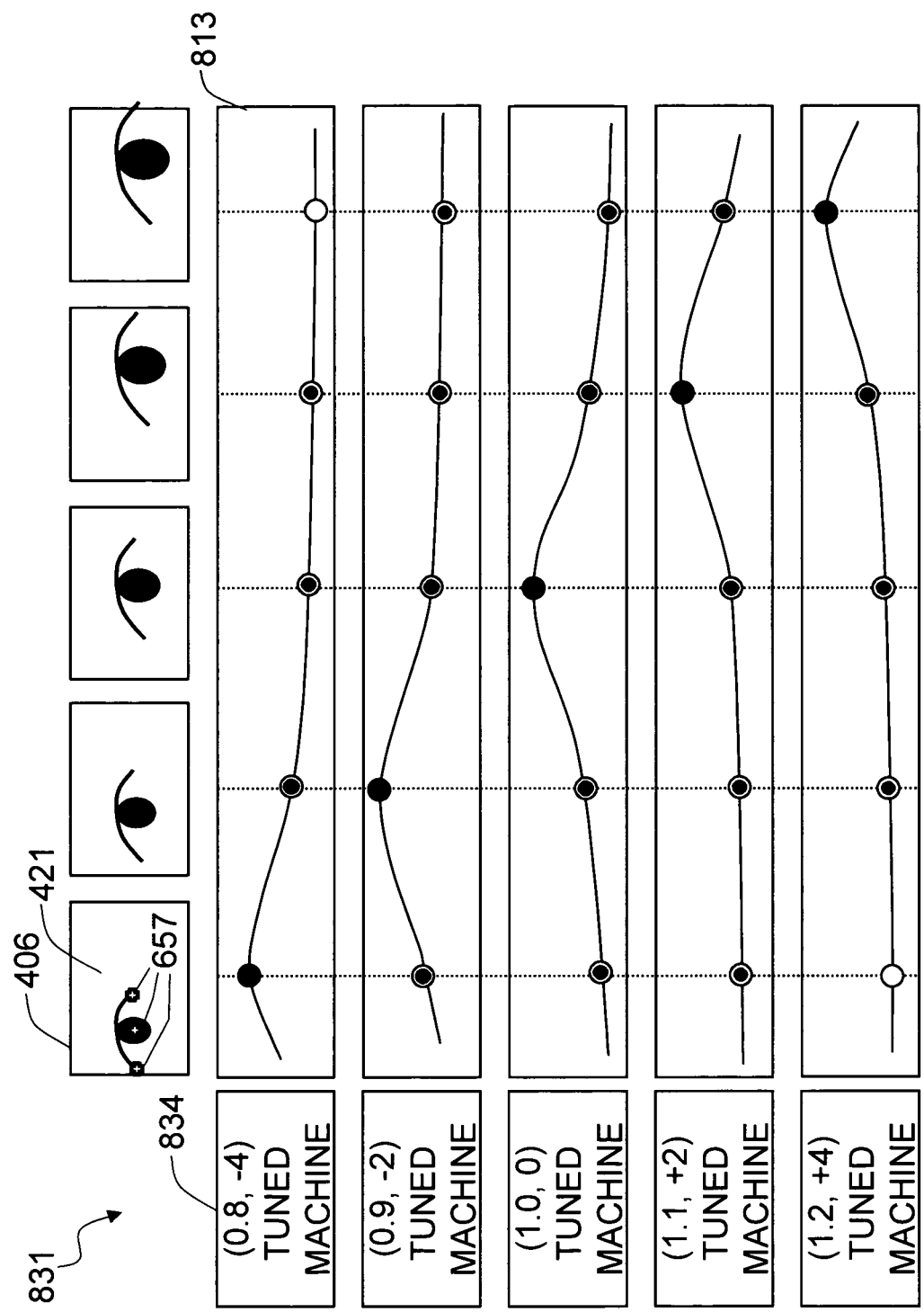
FIG. 5 shows a facial feature localization training scheme in an exemplary embodiment of the present invention.

FIG. 5 shows a facial feature localization training scheme 831 in an exemplary embodiment of the present invention. The face localization training 820 can be performed on facial images 631, instead of facial feature images 643, in a similar manner.

This exemplary training scheme aims to estimate the x (horizontal) shift, y (vertical) shift, the scale, and the orientation of the right eye within the standard facial feature window 406.

The training eye images are generated by cropping the standard facial feature window 406 of the right eye from the localized face. The facial landmark points of the face are assumed to be known, and the coordinates of the landmark points 657 after going through the face localization 380 step are available.

Given an input right eye image 421, the machine having the inherent geometry of (x0, y0, s0, o0) is trained to output the likelihood of the eye image 421 having the inherent geometry. If the input training eye has the (ex, ey, es, eo), then the target output is the Gaussian likelihood: $L=\text{Exp}(-(ex-x0)/kx-(ey-y0)/ky-(es-s0)/ks-(eo-o0)/ko)$. kx, ky, ks, and ko are constants determined empirically. (ex, ey, es, eo) can be easily determined beforehand using the coordinates of the landmark points relative to the standard facial feature positions and sizes.

Each plot in FIG. 5 illustrates the responses 813 profile that each machine is trained to learn. Each machine is trained to produce a peak for the eye image 421 having the matching geometry, and to produce gradually lower values as the geometry changes from the inherent geometry of the machine. In this exemplary embodiment, multiple learning machines are employed to estimate the x-location and the scale of the right eye, where each machine is tuned to a specific (x-shift, scale) pair; the figure is illustrated only for the two dimensions (x, s)=(x-shift, scale) for the purpose of clear presentation.

Figure 6:
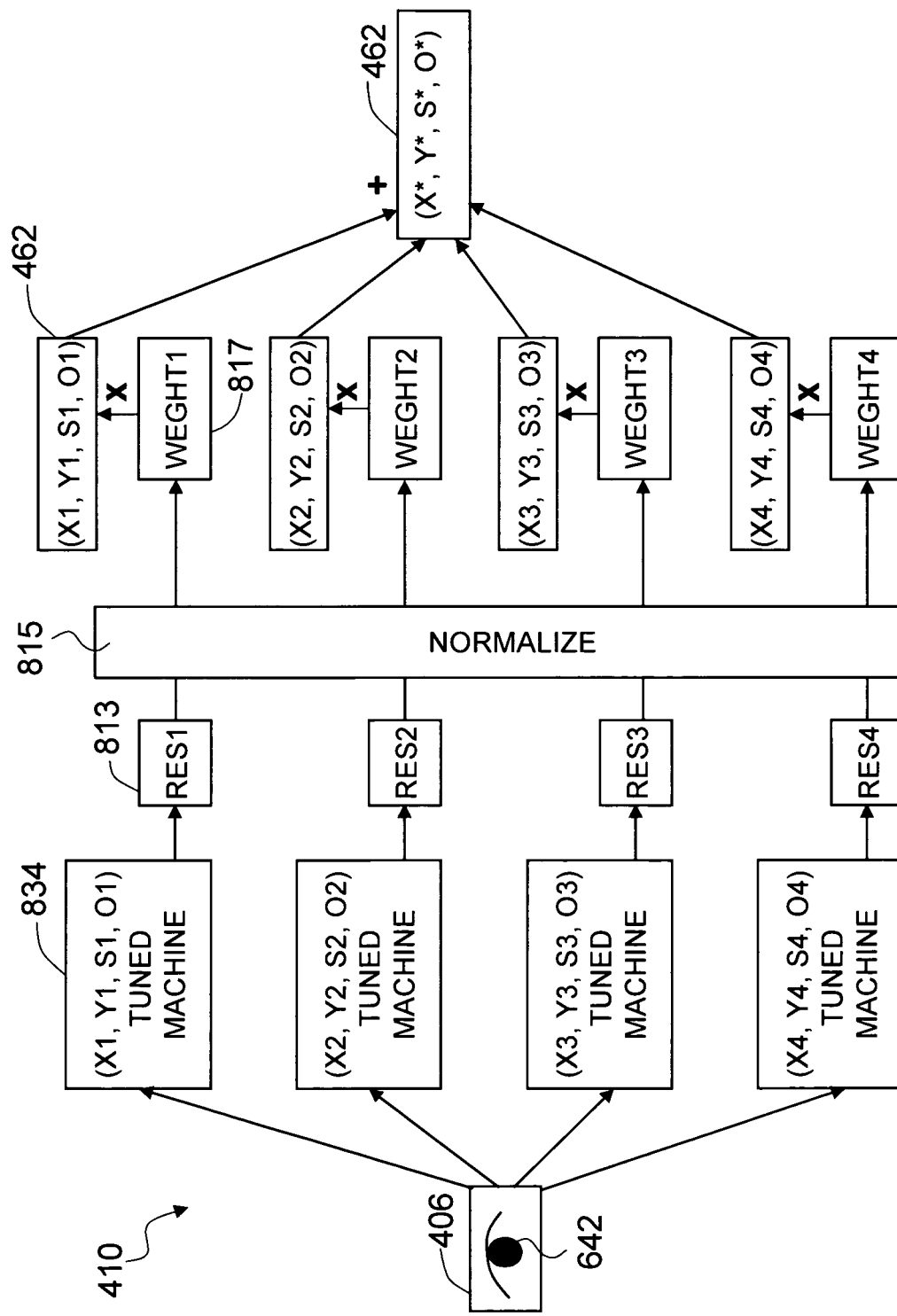
FIG. 6 shows the facial feature localization scheme in an exemplary embodiment of the present invention.

FIG. 6 shows the facial feature localization 410 scheme in an exemplary embodiment of the present invention. The face localization 380 can be performed on a facial image 630, instead of a facial feature image 642, in a similar manner.

Once each facial feature tuned machine 834 has been trained to output the likelihood of the given facial feature to have the predetermined pose vector (xi, yi, si, oi), an array of such learning machines can process any facial feature image 642 to compute the likelihoods.

A given facial feature image 642 inside the standard facial feature window 406 is fed to the trained learning machines, and then each machine outputs the responses 813 to the particular pose vector 462 (xi, yi, si, oi). The responses are then normalized 815 by dividing them by the sum of the responses to generate the weights 817. The weight is then multiplied to the corresponding pose vector (xi, yi, si, oi). The pose vectors (x1, y1, s1, o1), . . . , (xN,yN,sN,oN) are weighted and added up to compute the estimated pose vector (x*, y*, s*, o*). The pose vector represents the difference in position, scale, and orientation that the given facial feature image has against the standard feature positions and sizes. The pose vector is used to correctly extract the facial features and the transient features.

Figure 7:
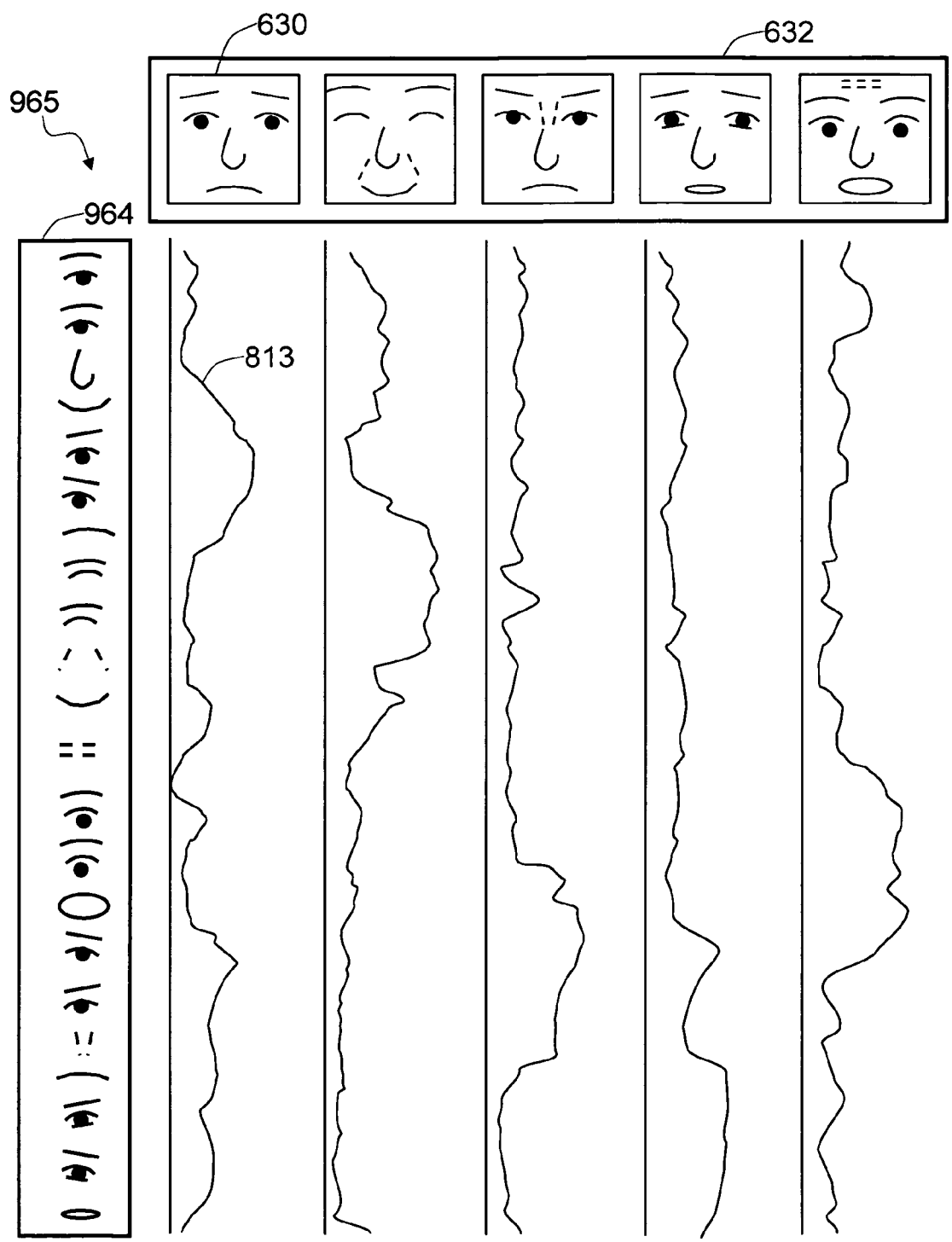
FIG. 7 shows an exemplary embodiment of the emotion-sensitive feature learning.

FIG. 7 shows an exemplary embodiment of the emotion-sensitive feature learning 965 step. The step aims to derive a set of filters that are matched to facial feature shapes or transient feature (facial wrinkles) shapes, so that the filters can extract the features relevant to facial expressions, and at the same time can ignore other image variations due to lighting, etc. First a large number of emotion-sensitive feature candidate filters 964 are generated that are designed to extract edge responses of the facial features or transient features; the positions and shapes of the filters match the corresponding positions and the shapes of the features. Then the filters are applied to a facial image database 632 of many different people showing a variety of facial expressions. Each facial image 630 goes through the face localization 380 step and facial feature localization 410 step, so that the locations and sizes of the filters match the estimated location and sizes of the facial features of the facial image 630. After the filter responses 813 are collected, the subset of the candidate filters that gave rise to sufficient response to some proportion of facial images are chosen as the emotion-sensitive feature filters 963.

Figure 8:
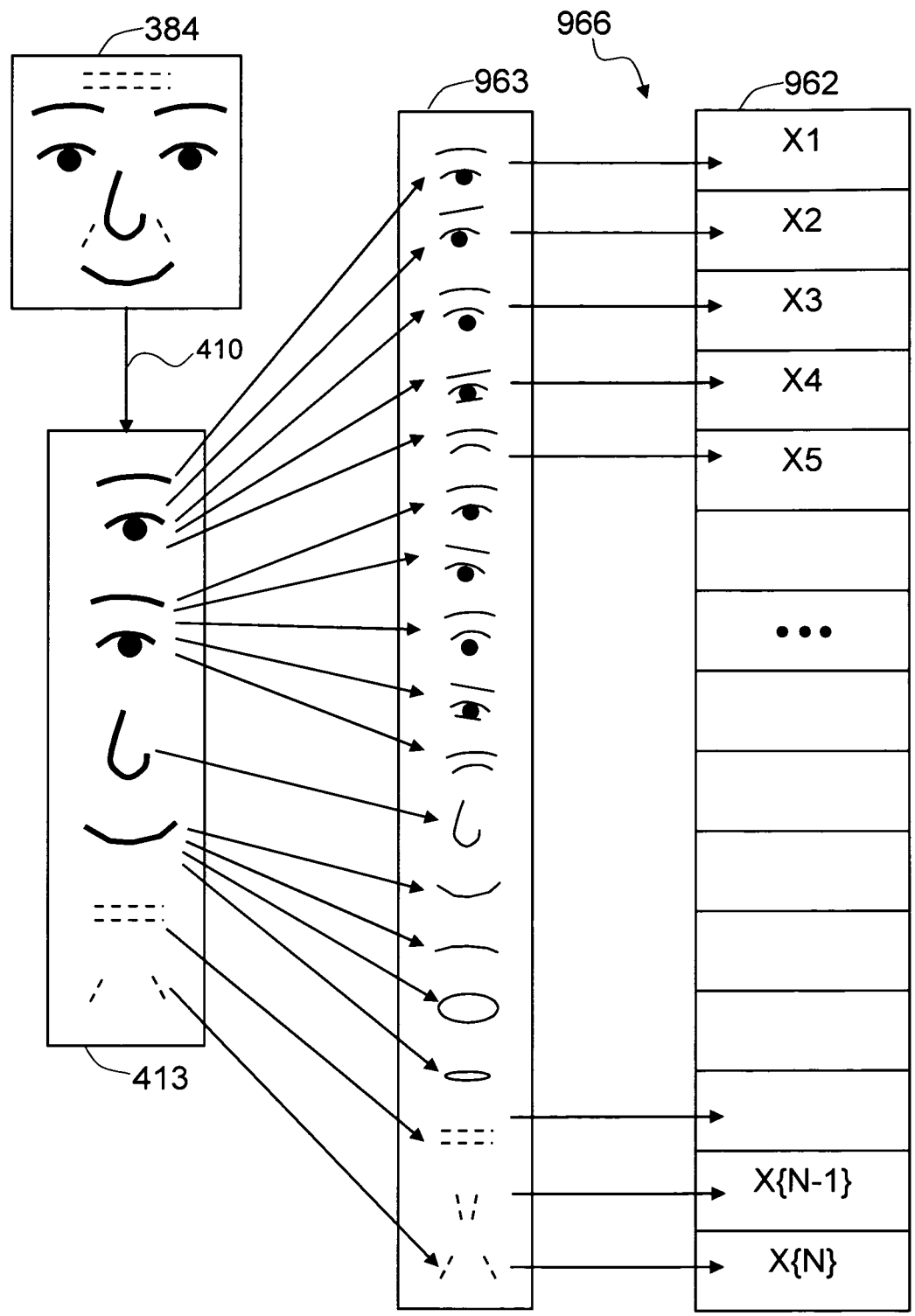
FIG. 8 shows the emotion-sensitive feature extraction scheme.

FIG. 8 shows the emotion-sensitive feature extraction 966 scheme once the emotion-sensitive feature filters 963 have been derived. The localized facial image 384 goes though the facial feature localization 410 step to generate individual features in facial feature localized facial image 413. Then each filter in the emotion-sensitive feature filters 963 is applied to the correspondingly aligned feature in the image to compute the response. Effectively, the facial image is compared to many potential candidate facial expressions, and those filters matching the true facial expression are designed to yield high responses. All the responses are collected in the emotion-sensitive feature vector 962.

Figure 9:
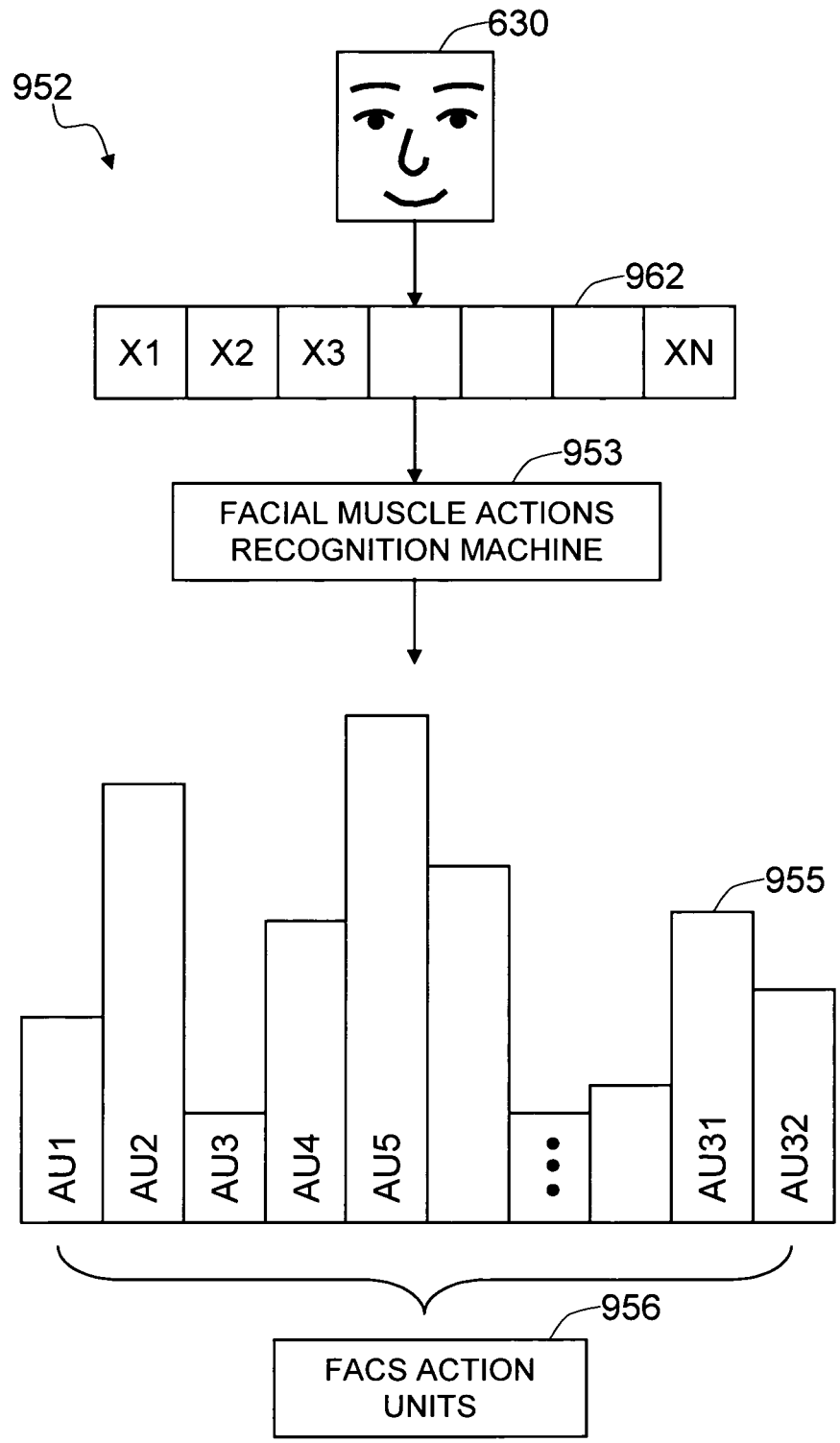
FIG. 9 shows an exemplary embodiment of the facial muscle actions recognition step.

FIG. 9 shows an exemplary embodiment of the facial muscle actions recognition 952 step. Because of the complex relation between the emotion-sensitive feature responses and the facial expressions, it is not straightforward to make a direct connection between the emotion-sensitive filter responses and the facial expressions. A large number of such emotion-sensitive feature vectors 963 along with the ground-truth facial muscle actions are utilized to learn the relation within a machine learning framework. The step is called the emotion-sensitive features to facial muscle actions learning 968, and the product of this step is the facial muscle actions recognition machine 953. Once the emotion-sensitive feature vector 962 has been computed from the input facial image 630, they are fed to the facial muscle actions recognition machine 953 to estimate the likelihood of the facial image having each of the muscle actions. In this exemplary embodiment, the FACS (Facial Action Coding System) Action Units 956 are employed to represent the facial muscle actions 951. In this exemplary embodiment, the facial muscle actions recognition 952 outputs the 32-dimensional vector where each component represents the likelihood of the given facial image having the corresponding Action Unit 955. In this exemplary embodiment, the emotion-sensitive features to facial muscle actions learning 968 can utilize the six emotion categories 902 data determined by a human operator to derive the FACS Action Units 956 ground-truth data based on the relation laid out in FIG. 10.

FIG. 10 shows a table that lists the association between the set of FACS Action Units 956 and the set of six emotional categories 902, in an exemplary embodiment of the present invention. A subset of FACS Action Units 956 is listed in each row as a manifestation of each emotional category. The FACS Action Units are divided into primary visual cues 957 and auxiliary visual cues 958. The primary visual cues 957 are the Action Units that always accompany the manifestation of the emotion. The auxiliary visual cues 958 are the Action Units that do not necessarily accompany the expression at all times but can serve as additional evidence. For example, if a facial image shows AU 6, AU 12, then it is very highly likely that the face is expressing "Happiness." The occurrence of AU 25, Au 26, and AU 16 will provide additional evidence to the decision.

FIG. 11 shows an exemplary embodiment of the mapping from the FACS Action Units 956 to the six emotional categories 902 generated based on the table in FIG. 10. The strong association between the primary visual cues 957 and the corresponding emotional category 901 is represented by arrows with solid lines. The weak association between the auxiliary visual cues 958 and the corresponding emotional category is represented by arrows with dashed lines.

FIG. 12 shows a spatial arrangement of six emotional categories in the three-dimensional affect space 922. This relation effectively constrains a mapping from the space of six-dimensional emotion categories to the three-dimensional affect space 922, so that the estimated facial muscle actions 951 can be projected into the affect space 922. The affect space 922 encodes human response characteristics in a more direct manner, employing the notions of arousal 924, valence 928, and stance 935; the present invention assumes that these affective states provide information more directly relevant to the recognition of people's response toward a visual stimulus. For example, the degree of valence directly reveals the positive or negative attitude.

FIG. 13 shows an exemplary embodiment of how the measured instances of facial muscle actions 951 from a sequence of facial images 633 are projected into the affect space 922 to construct an emotion trajectory 910. From a sequence of facial images 633, an emotion-sensitive feature vector 962 is extracted from each facial image 630. The facial muscle action recognition 952 step then finds the facial muscle actions 951 corresponding to the emotion-sensitive feature vector 962. The facial muscle actions 951 then determine the likelihood of the manifested expression belonging to each of six emotional categories 902. Then the likelihoods determine the coordinate of the instance of emotion in the affect space 922. A series of such estimations from the sequence of facial images 633 generates an emotion trajectory 910 in affect space 922.

FIG. 14 shows an optional emotion trajectory normalization 995 step where the emotion trajectory 910 is temporally normalized by the events information detected by the visual stimulus event detection 991 step. The step can be employed after the emotion trajectory estimation 912 and before the response estimation 914, to help the response estimation 914 step. The visual stimulus event detection step identifies meaningful events in the visual stimulus and partitions the whole duration into the segments where each segment corresponds to a specific content of the visual stimulus. Once the correspondence between each event 990 and the segment 985 in the emotion trajectory 910 has been made, the temporal length of the segment is normalized in length to produce a normalized segment 997. The resulting normalized emotion trajectory 998 is then fed to the response estimation 914 step. The motivation behind the temporal normalization is that the response estimation 914 would be more meaningful when the emotional response segments (from different facial image sequences) corresponding to the same event in the visual stimulus have the same length. Then the emotion trajectory to response learning 916 would do a better job of finding the mapping from the emotion trajectories to the responses.

FIG. 15 shows an exemplary embodiment of the response estimation 914 step. In this embodiment, the goal is to determine whether a person's emotional response has changed to positive or to negative after exposure to the visual stimulus. The interest is only in the direction of attitude changes 988 regardless of the intermediate changes of emotions. However, we assume that the final response is still affected by the intermediate emotional states; the direction of changes is not just the difference between the initial state 917 and the terminal state 918. Toward this end, a learning machine can be trained to make the binary decision using a large number of samples. Under this scenario, the visual stimulus event detection 991 step just provides the starting time and the end time of the visual stimulus, thereby determining the initial state 917 and terminal state 918 of the emotion trajectory. The input to the training can be the series of three-dimensional coordinates of the emotion trajectories 910 between the initial state 917 and the terminal state 918, and the output can be either −1 (negative) or +1 (positive).

FIG. 16 shows a response estimation 914 scheme in an exemplary embodiment of the present invention. The procedures previously laid out process a sequence of facial images 633 showing emotional response to a visual stimulus 980, and generate an emotion trajectory 910 in affect space. The final quantity of interest in this embodiment is the rating 989 of the visual stimulus 980 by a human audience 790. In this embodiment, the goal is to predict the ratings 989 of the visual stimulus only based on the emotion trajectory 910. The ratings 989 can be such as the degree of visual attractiveness of a product, the willingness to buy a product, or the opinion about the advertisement media. The ratings 989 can typically have numeric form such as numbers from 1 to 10.

FIG. 17 shows an exemplary embodiment of the emotion trajectory to response learning 916 step that is necessary for the response estimation 914 step. Given the videos of subject people exposed to the visual stimulus, ground-truth ratings can also be collected by asking the people to rate the visual content. Then the collected video data along with the ratings data can be used to train the response estimation machine 915. Then the response estimation machine 915 can automatically predict the ratings 989 based on the emotion trajectory estimated from the video sequence capturing the face of any person watching the same visual content, without making an inquiry.

FIG. 18 shows exemplary hardware components in an exemplary embodiment of the present invention. The hardware components consist of the training system 174 and the response recognition system 177.

In an exemplary embodiment of the present invention, the training system 174 comprises a generic personal computer having a control and processing system 162 and an internal storage 132. A Pentium 4 2.8 GHz PC having 1 GB memory can serve as a control and processing system 162. A generic IDE hard disk drive can serve as the internal storage 132. The control and processing system applies a training algorithm to generate a trained learning machine.

In an exemplary embodiment of the present invention, the response recognition system 176 comprises the means for capturing images 100, the emotion recognition system 177, and the event detection system 178.

The means for capturing images 100 comprises a first means for capturing images 101 and a second means for capturing images. Analog cameras, USB cameras, or Firewire cameras can serve as means for capturing images.

The emotion recognition system comprises a control and processing system 162, an internal storage 132, a visual display 152, and a network connection 164. The learning machines trained from the training system 174 can be transferred to the internal storage 132 of the emotion recognition system 177 using the means for transferring data 140. The first means for capturing images 101 are connected to the control and processing system 162. The control and processing system accepts digitized video data from the first means for capturing images 101. The control and processing system 162 then processes the digitized facial images, to estimate the response. The estimated response can be stored in the internal storage 132, or can be displayed to the visual display 152, or can be transmitted remotely using the network connection 164.

In the event detection system 178, the digitized video data from the second means for capturing images 102 can be used to find meaningful events from the scene that relate to the visual stimulus. The control and processing system 162 provides the detected event information to the control and processing system 162 in the emotion recognition system 177 to help estimate the response in the emotion recognition system 178.

While the above description contains much specificity, these should not be construed as limitations on the scope of the invention, but as exemplifications of the presently preferred embodiments thereof. Many other ramifications and variations are possible within the teachings of the invention. Thus, the scope of the invention should be determined by the appended claims and their legal equivalents, and not by the examples given.

What is claimed is:

1. A method for determining a person's emotional response to a visual stimulus, based on the person's facial expressions, comprising the following steps of:
   a) detecting and tracking a face from input images of the person captured by at least a means for capturing images, and localizing the face and facial features,
   b) deriving emotion-sensitive feature filters by generating emotion-sensitive candidate filters and determining the emotion-sensitive feature filters by choosing the filters that yield high responses to a predefined number of facial images from the emotion-sensitive candidate filters,
   c) extracting emotion-sensitive features from the face by applying the emotion-sensitive feature filters to localized facial features and transient features,
   d) determining facial muscle actions of the face based on the emotion-sensitive features,
   e) calculating likelihoods of expressions belonging to each of emotional categories using the facial muscle actions,
   f) finding the changes in affective state, called an emotion trajectory, of the person based on the facial muscle actions, and g) determining the response of the person to the visual stimulus, by analyzing the emotion trajectory, wherein the likelihoods determine the coordinates of instances of emotion in affect space, and wherein a series of estimations for the coordinates generates the emotion trajectory in the affect space.

2. The method according to claim 1, wherein the method further comprises a step of training a plurality of first machines for localizing the face, wherein each first machine is trained to output high response to face images having horizontal shift, vertical shift, scale, and orientation that are close to a predetermined horizontal shift, vertical shift, scale, and orientation of the first machine.

3. The method according to claim 1, wherein the method further comprises a step of training a plurality of second machines for localizing facial features in the face, wherein each second machine is trained to produce a peak for a facial feature having a matching geometry, and to produce lower values as the geometry changes from an inherent geometry of the machine.

4. The method according to claim 1, wherein the method further comprises a step of generating emotion-sensitive candidate filters by constructing a set of filters where each filter is designed to collect gradient response of a specific facial feature or a transient feature.

5. The method according to claim 1, wherein the method further comprises a step of training a third machine so that the machine accepts the emotion-sensitive features as an input and computes a vector output where each component of the vector is the likelihood of the emotion-sensitive features arising from a specific facial muscle action.

6. The method according to claim 1, wherein the method further comprises a step of determining an affective state of the face by using the mapping from the facial muscle actions to emotional categories, wherein the facial muscle actions are determined based on the emotion-sensitive features, and wherein the changes in the emotional categories are represented by the emotion trajectory using deterministic facial muscle actions to affect space mapping.

7. The method according to claim 1, wherein the method further comprises a step of determining an affective state of the face by using coordinates of emotional categories in the affect space.

8. The method according to claim 1, wherein the method further comprises a step of determining the response of the person to the visual stimulus, by comparing an initial state and a terminal state, wherein direction of emotional attitude change is determined regardless of intermediate changes of emotion.

9. The method according to claim 1, wherein the method further comprises a step of segmenting the visual stimulus in terms of the visual content.

10. The method according to claim 9, wherein the method further comprises a step of determining the response of the person to the visual stimulus, by analyzing the emotion trajectory in relation to the segmented contents in visual stimulus.

11. The method according to claim 9, wherein the method further comprises a step of segmenting the emotion trajectory so that each segment in the emotion trajectory is an emotional response to a segment in the visual stimulus.

12. The method according to claim 9, wherein the method further comprises a step of segmenting the emotion trajectory and normalizing the emotion trajectory so that the temporal length of each visual stimulus segments has a fixed standard size.

13. The method according to claim 1, wherein the method further comprises a step of determining the response of the person to the visual stimulus, by training a fourth machine using a plurality of emotion trajectories and ratings data, wherein the machine predicts the rating based on the emotion trajectory.

14. An apparatus for determining a person's emotional response to a visual stimulus, based on the person's facial expressions, comprising:

a) means for detecting and tracking a face from input images of the person captured by at least a means for capturing images, and localizing the face and facial features, b) means for deriving emotion-sensitive feature filters by generating emotion-sensitive candidate filters and determining the emotion-sensitive feature filters by choosing the filters that yield high responses to a predefined number of facial images from the emotion-sensitive candidate filters, c) means for extracting emotion-sensitive features from the face by applying the emotion-sensitive feature filters to localized facial features and transient features, d) means for determining facial muscle actions of the face based on the emotion-sensitive features, e) means for calculating likelihoods of expressions belonging to each of emotional categories using the facial muscle actions, f) means for finding the changes in affective state, called an emotion trajectory, of the person based on the facial muscle actions, and g) means for determining the response of the person to the visual stimulus, by analyzing the emotion trajectory, wherein the likelihoods determine the coordinates of instances of emotion in affect space, and wherein a series of estimations for the coordinates generates the emotion trajectory in the affect space.

15. The apparatus according to claim 14, wherein the apparatus further comprises means for training a plurality of first machines for localizing the face, wherein each first machine is trained to output high response to face images having horizontal shift, vertical shift, scale, and orientation that are close to a predetermined horizontal shift, vertical shift, scale, and orientation of the first machine.

16. The apparatus according to claim 14, wherein the apparatus further comprises means for training a plurality of second machines for localizing facial features in the face, wherein each second machine is trained to produce a peak for a facial feature having a matching geometry, and to produce lower values as the geometry changes from an inherent geometry of the machine.

17. The apparatus according to claim 14, wherein the apparatus further comprises means for generating emotion-sensitive candidate filters by constructing a set of filters where each filter is designed to collect gradient response of a specific facial feature or a transient feature.

18. The apparatus according to claim 14, wherein the apparatus further comprises means for training a third machine so that the machine accepts the emotion-sensitive features as an input and computes a vector output where each component of the vector is the likelihood of the emotion-sensitive features arising from a specific facial muscle action.

19. The apparatus according to claim 14, wherein the apparatus further comprises means for determining an affective state of the face by using the mapping from the facial muscle actions to emotional categories, wherein the facial muscle actions are determined based on the emotion-sensitive features, and wherein the changes in the emotional categories are represented by the emotion trajectory using deterministic facial muscle actions to affect space mapping.

20. The apparatus according to claim 14, wherein the apparatus further comprises means for determining an affective state of the face by using coordinates of emotional categories in the affect space.

21. The apparatus according to claim 14, wherein the apparatus further comprises means for determining the response of the person to the visual stimulus, by comparing an initial state and a terminal state, wherein direction of emotional attitude change is determined regardless of intermediate changes of emotion.

22. The apparatus according to claim 14, wherein the apparatus further comprises means for segmenting the visual stimulus in terms of the visual content.

23. The apparatus according to claim 22, wherein the apparatus further comprises means for determining the response of the person to the visual stimulus, by analyzing the emotion trajectory in relation to the segmented contents in visual stimulus.

24. The apparatus according to claim 22, wherein the apparatus further comprises means for segmenting the emotion trajectory so that each segment in the emotion trajectory is an emotional response to a segment in the visual stimulus.

25. The apparatus according to claim 22, wherein the apparatus further comprises means for segmenting the emotion trajectory and normalizing the emotion trajectory so that the temporal length of each visual stimulus segment has a fixed standard size.

26. The apparatus according to claim 14, wherein the apparatus further comprises means for determining the response of the person to the visual stimulus, by training a fourth machine using a plurality of emotion trajectories and ratings data, wherein the machine predicts the rating based on the emotion trajectory.

\* \* \* \* \*